United States Patent [19]
Yamamoto

[11] Patent Number: 5,867,326
[45] Date of Patent: Feb. 2, 1999

[54] ZOOM LENS

[75] Inventor: Chikara Yamamoto, Saitama, Japan

[73] Assignee: Fuji Photo Optical Co., Ltd., Saitama, Japan

[21] Appl. No.: 917,512

[22] Filed: Aug. 26, 1997

[30] Foreign Application Priority Data

Aug. 26, 1996 [JP] Japan .................................. 8-244090

[51] Int. Cl.⁶ ............................ G02B 15/14; G02B 13/18
[52] U.S. Cl. ......................................... 359/686; 359/708
[58] Field of Search ................................. 359/686, 708, 359/683

[56] References Cited

U.S. PATENT DOCUMENTS 5,157,550  10/1992  Tsuchida et al. ..................... 359/686
5,220,458   6/1993  Ohshita ................................. 359/686
5,576,889  11/1996  Miyazaki .............................. 359/686

*Primary Examiner*—Scott J. Sugarman
*Attorney, Agent, or Firm*—Young & Thompson

[57] ABSTRACT

A zoom lens comprises, in order from the image end to the object end, a negative power first lens group, a positive power second lens group, a positive power third lens group and a positive power fourth lens group. The first, second and third lens groups are axially movable in predetermined relation relative to one another and relative to the fourth lens group which is stationary to focus and vary the focal length of the zoom lens. The zoom lens satisfies at least the following condition:

$$1.6 < D_{34w}/F_w < 2.8$$

where $D_{34w}$ is the axial air distance the third and fourth lens groups of the zoom lens at the wide angle end position and $F_w$ is the focal length of the overall zoom lens at the wide angle end position.

9 Claims, 21 Drawing Sheets

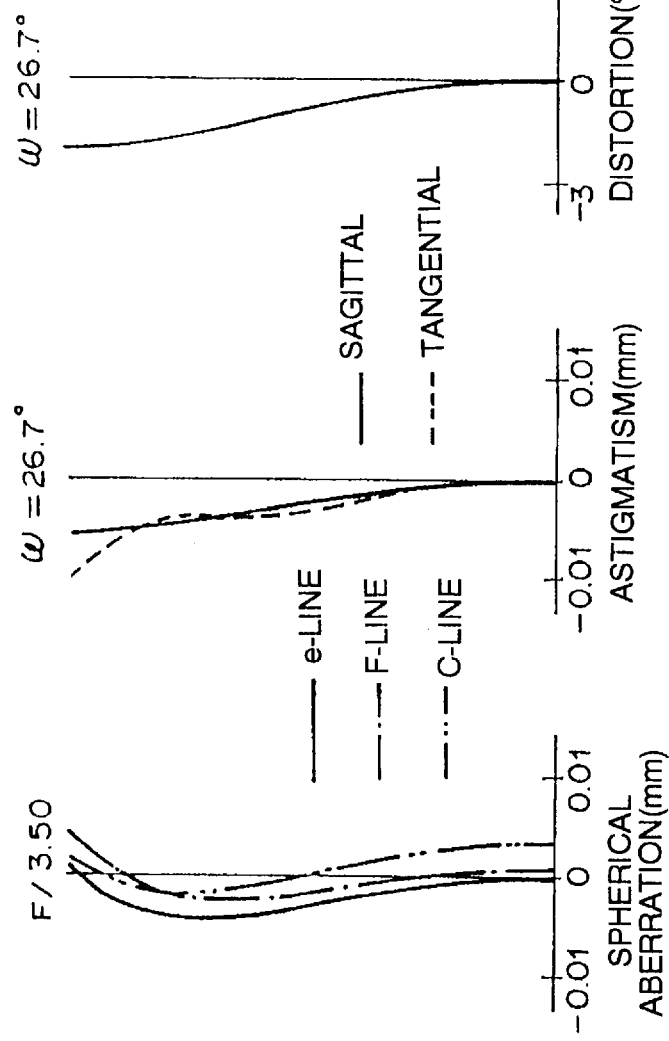

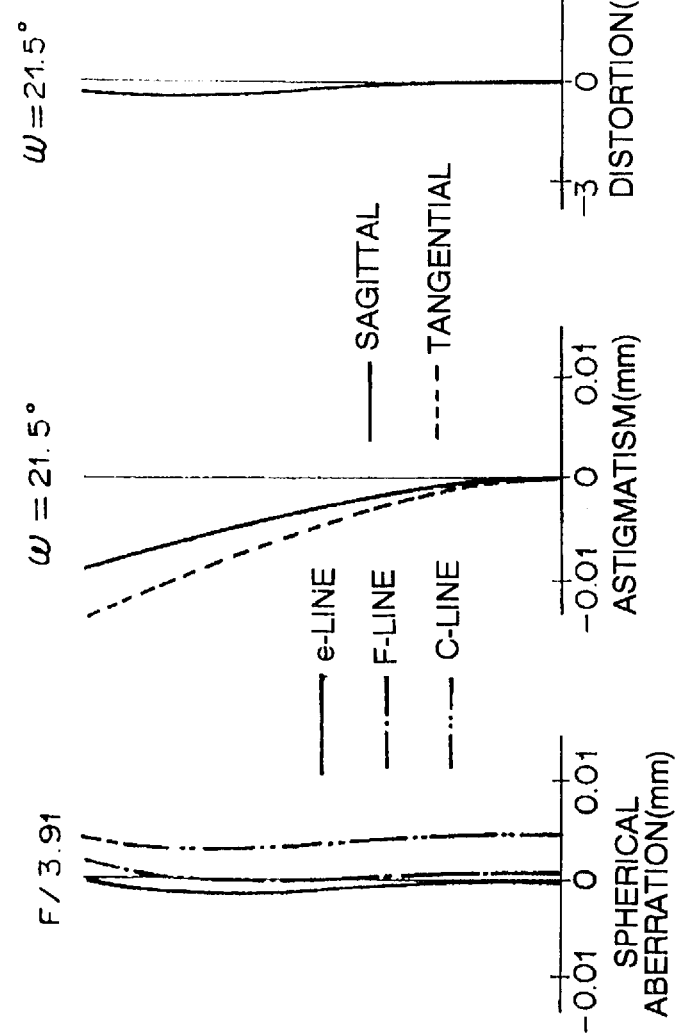

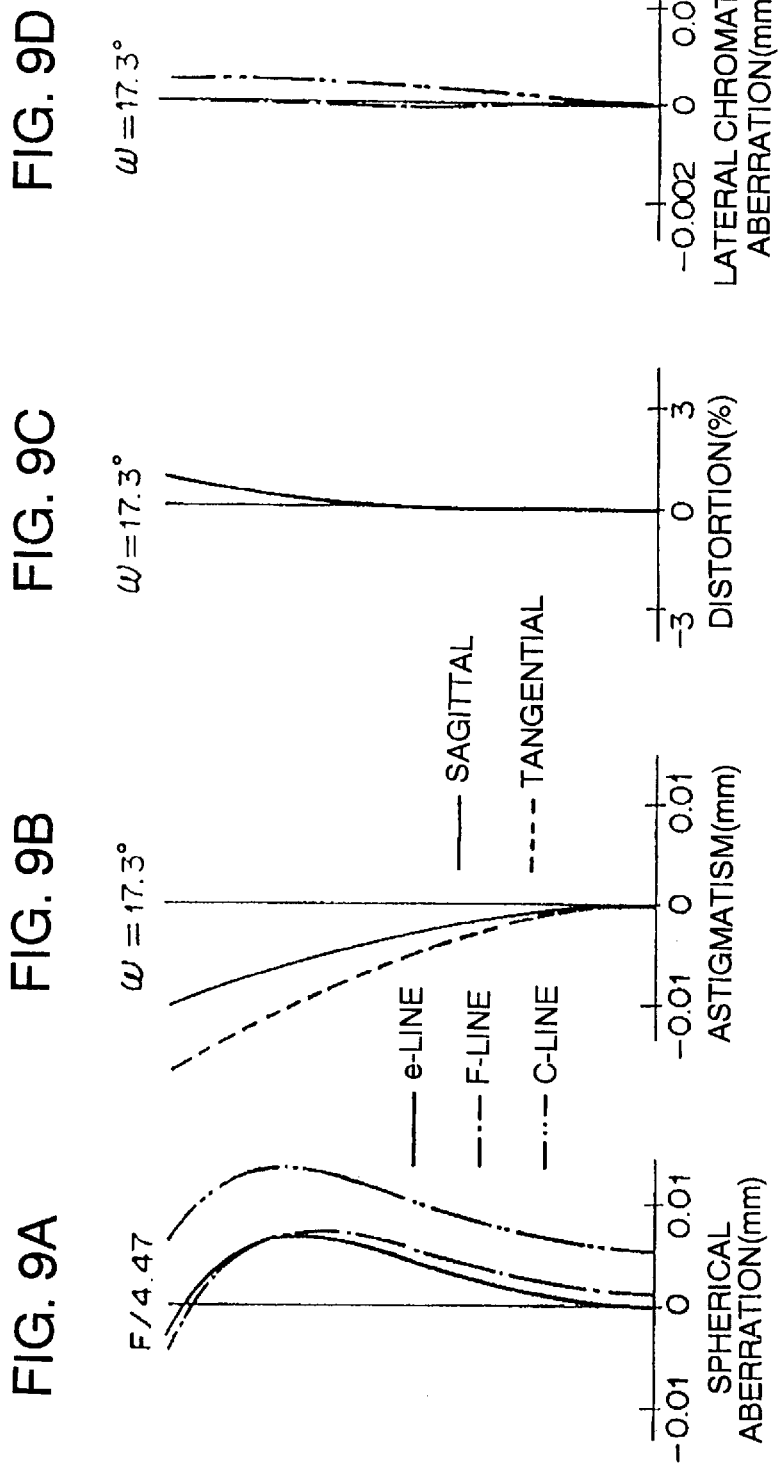

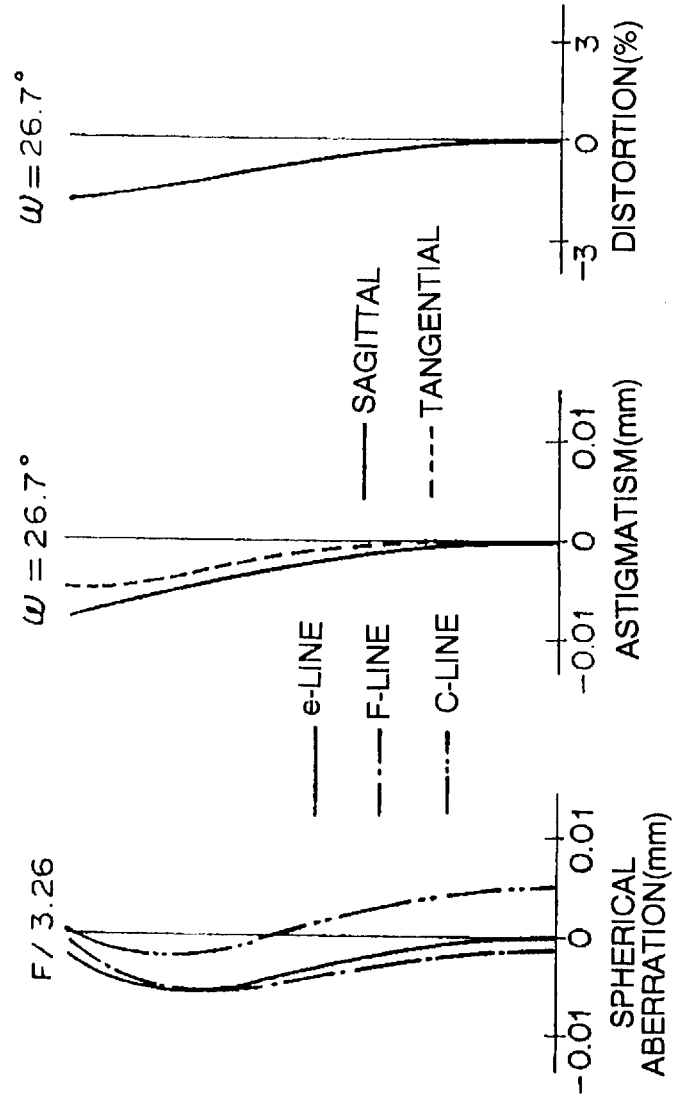

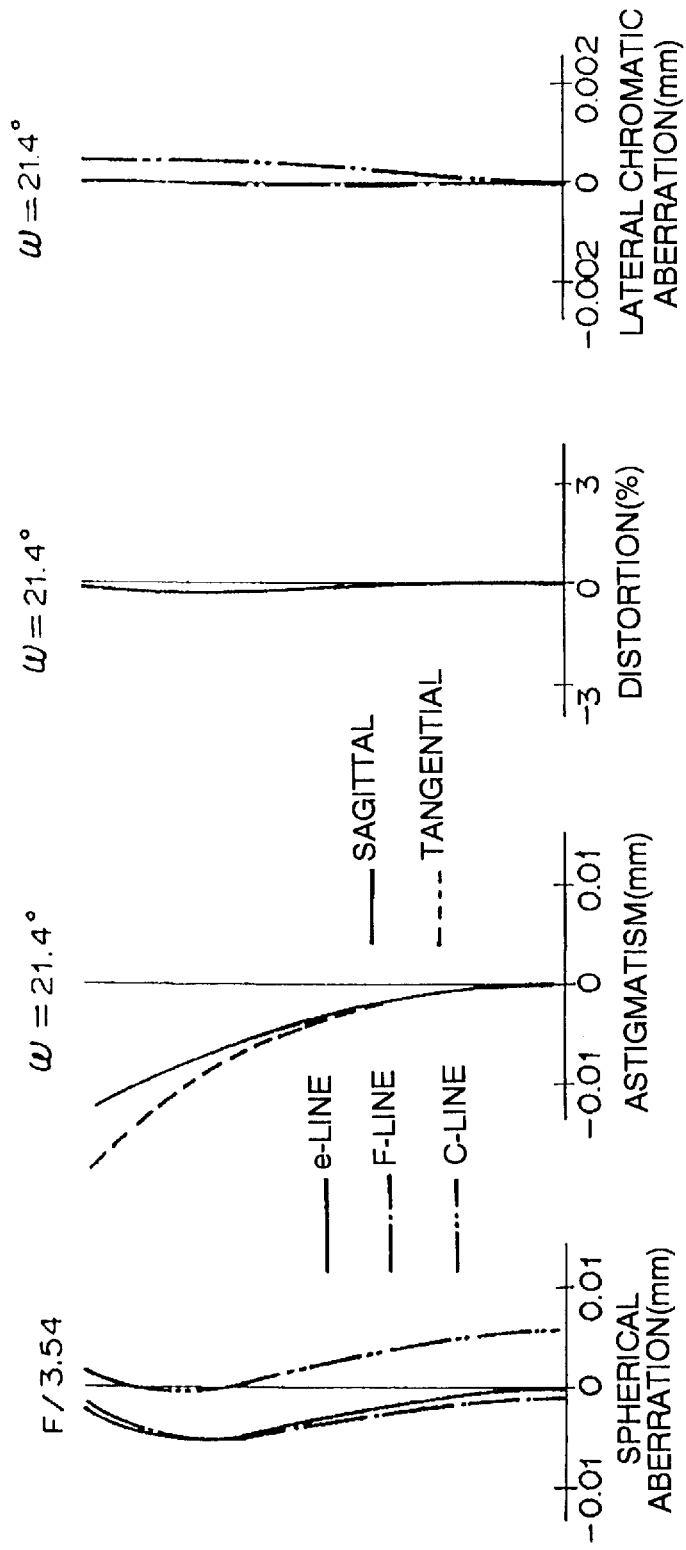

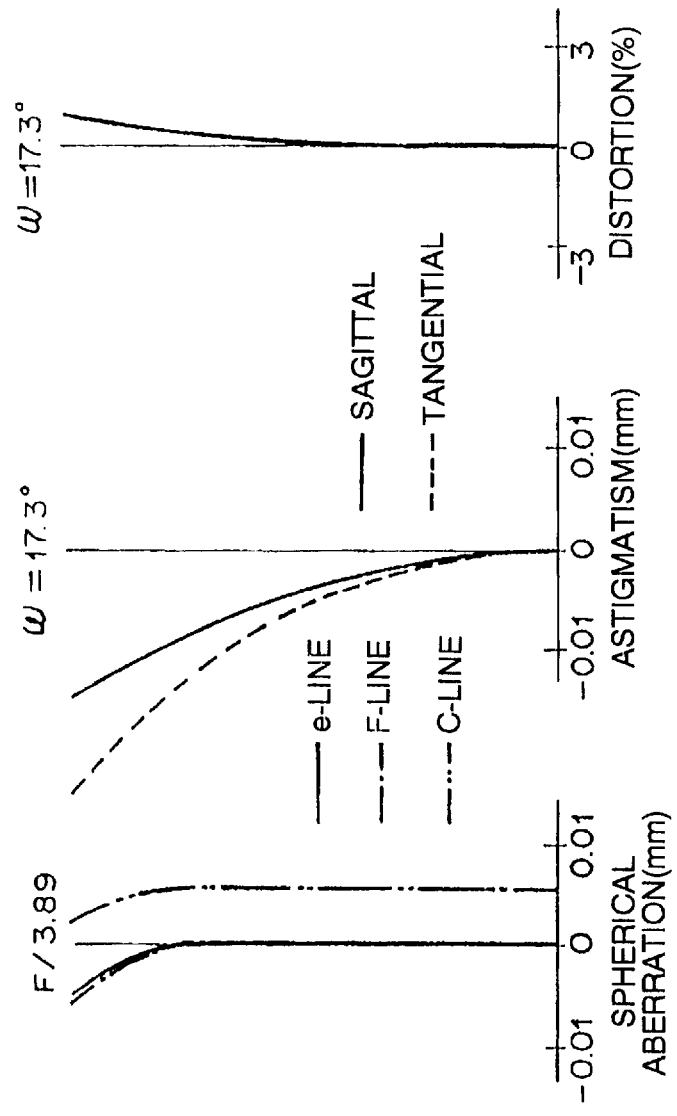

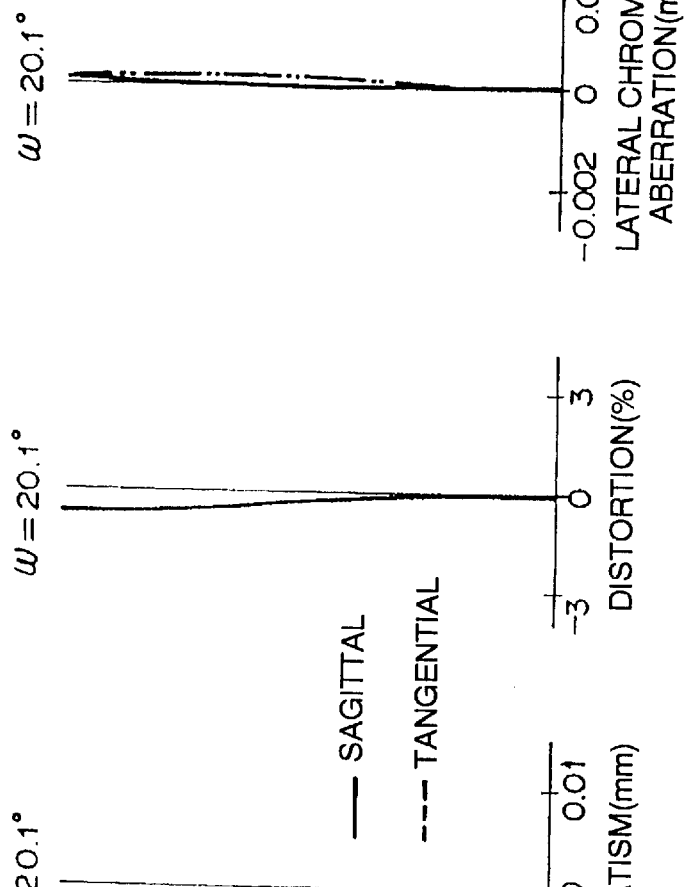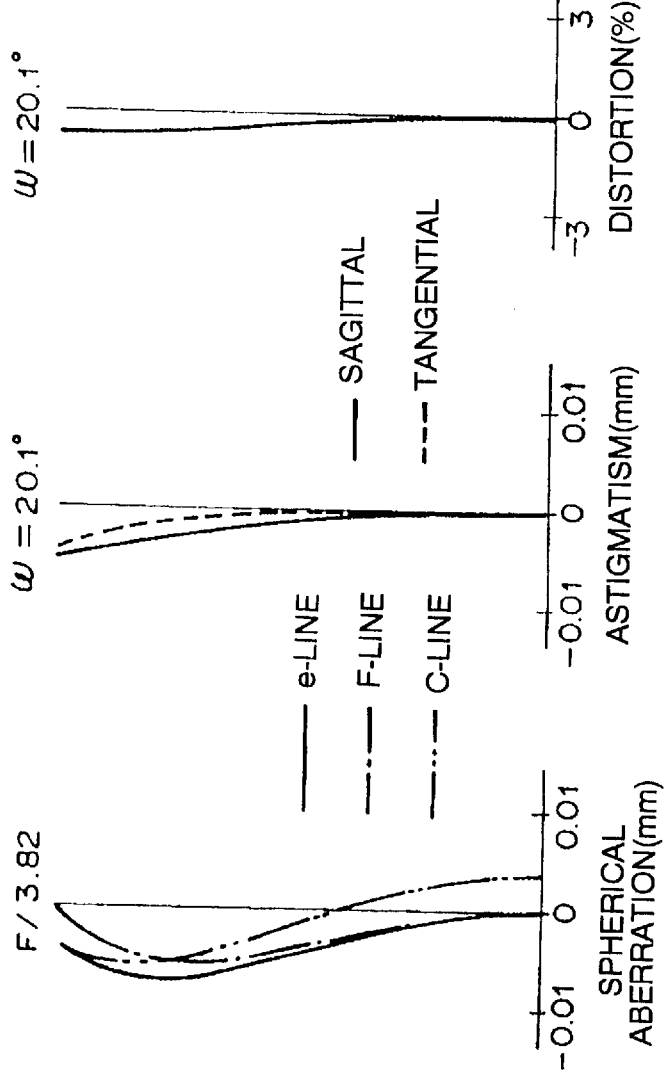

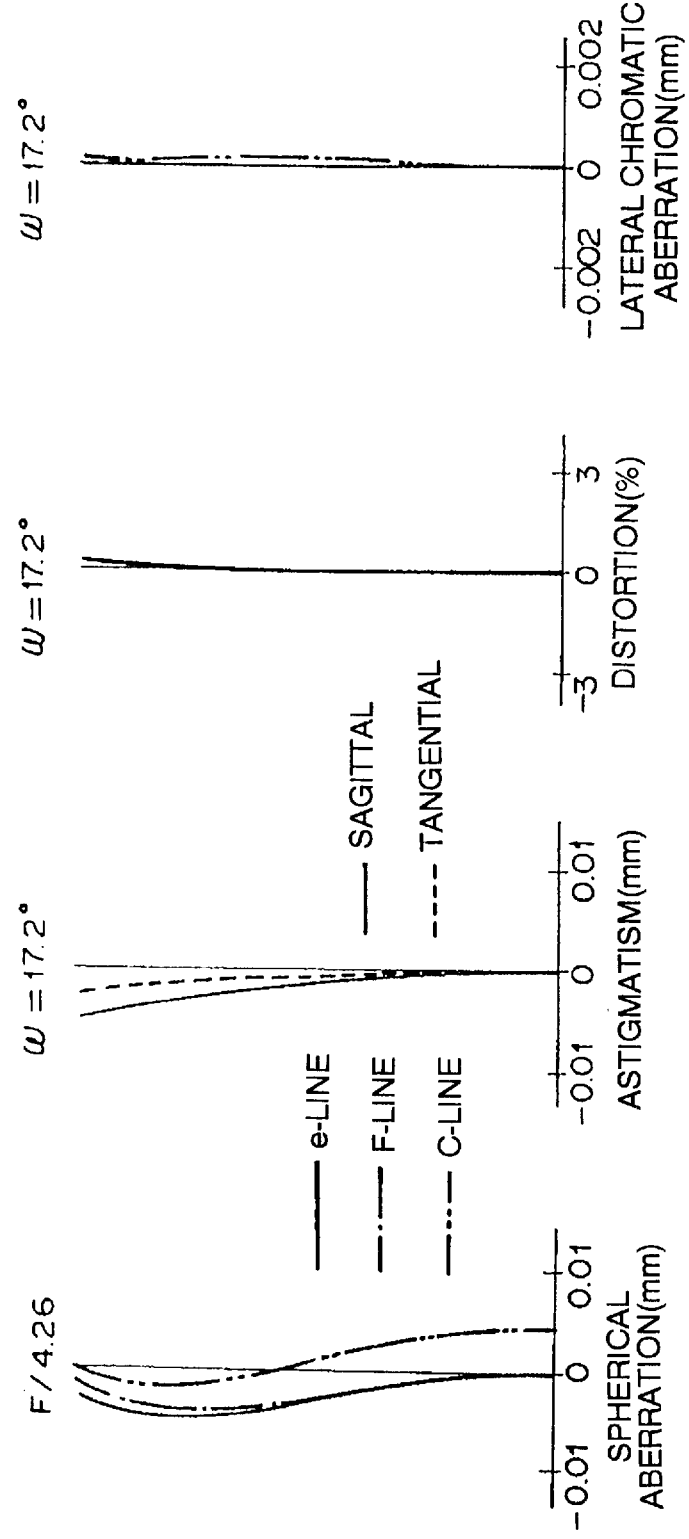

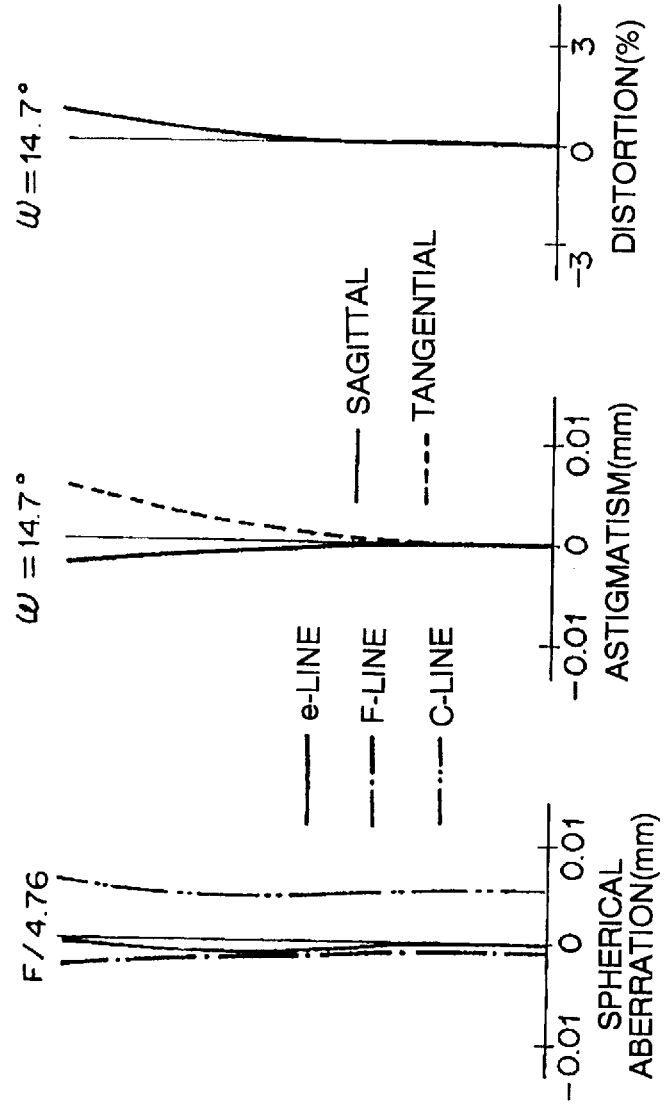

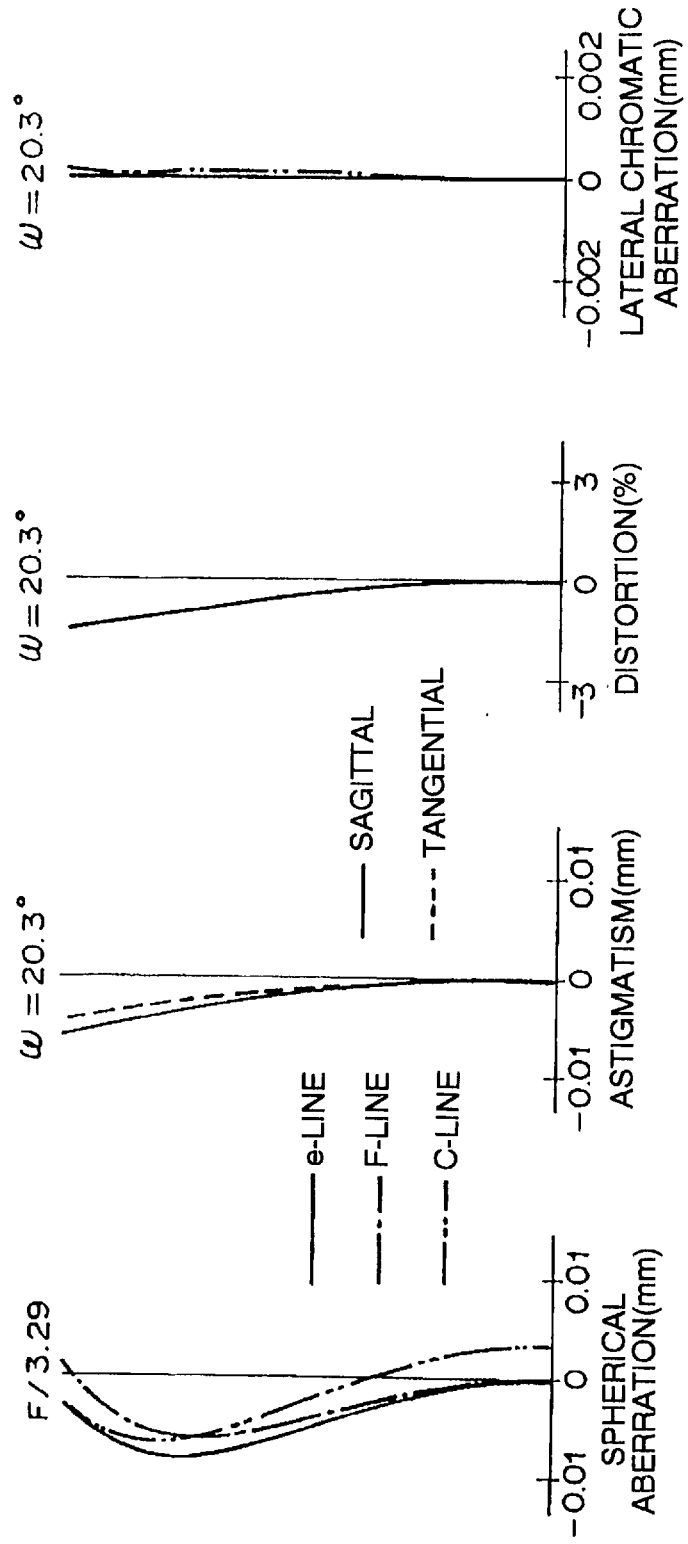

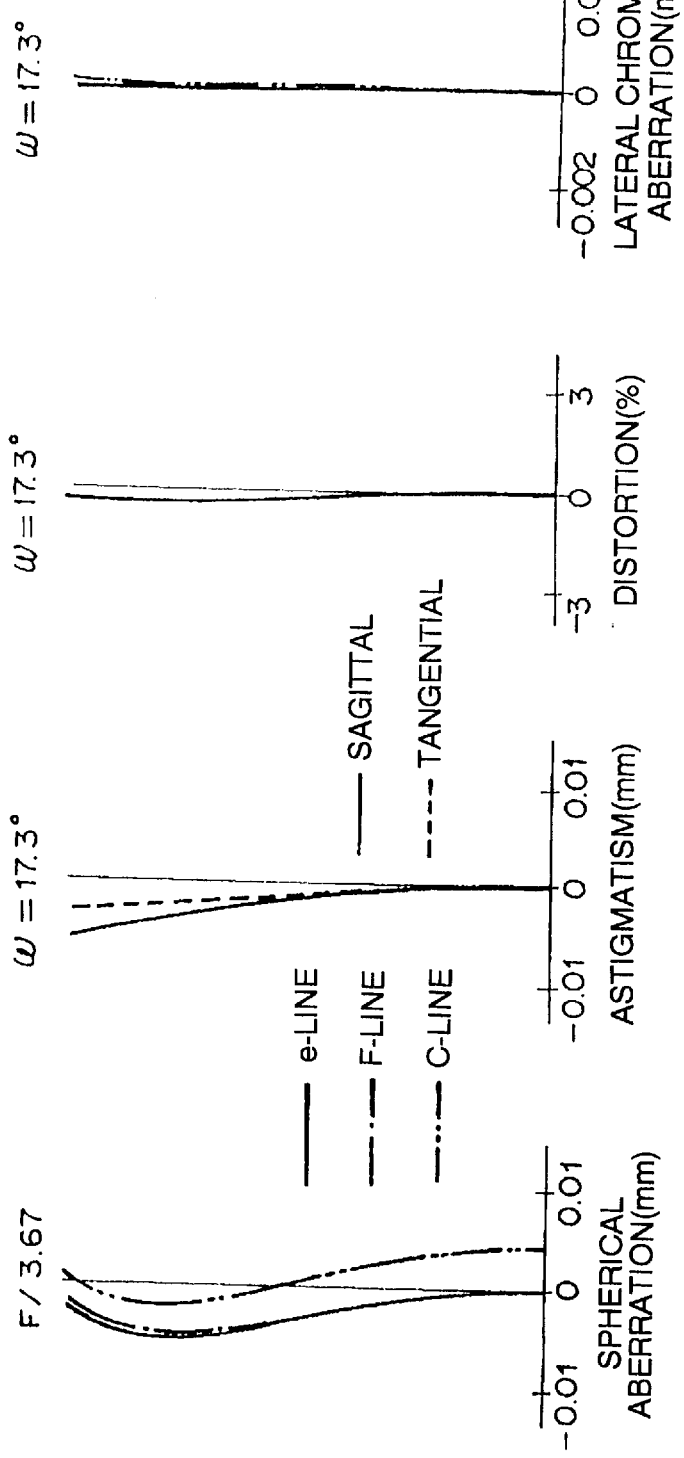

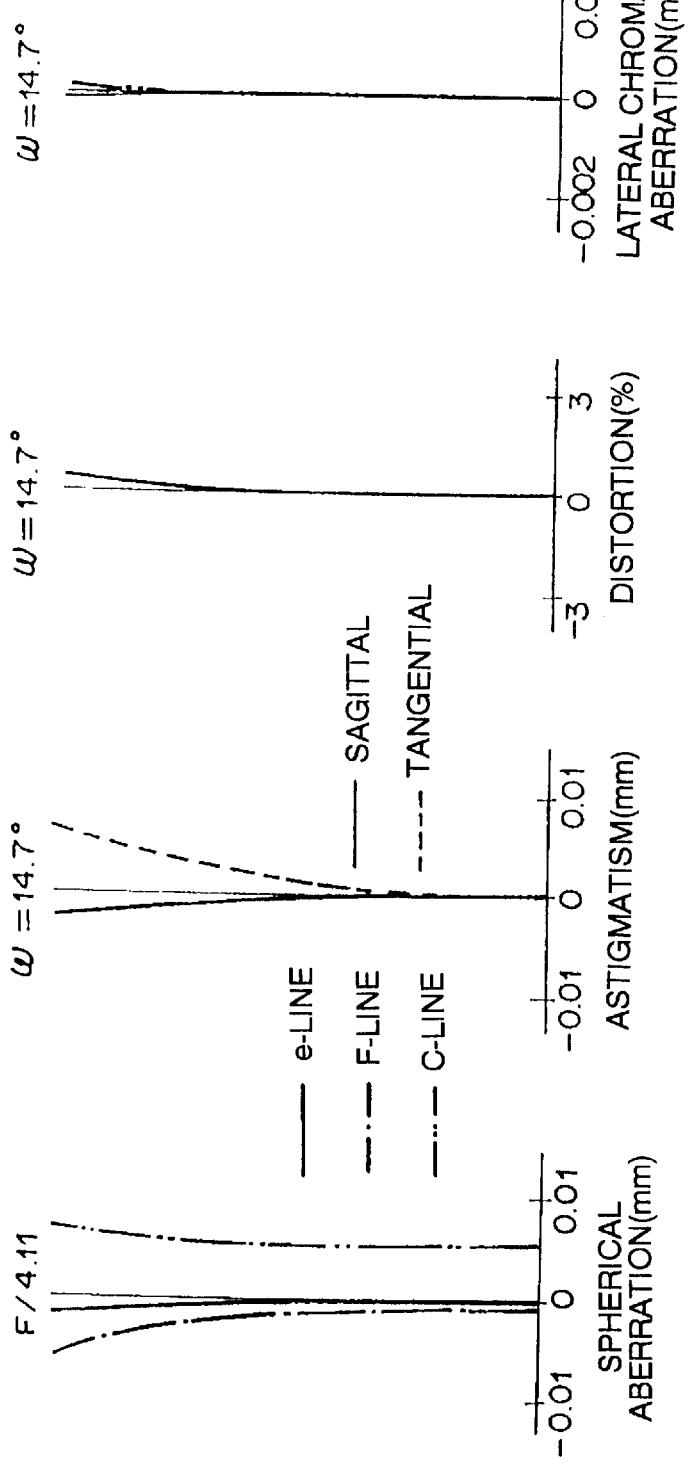

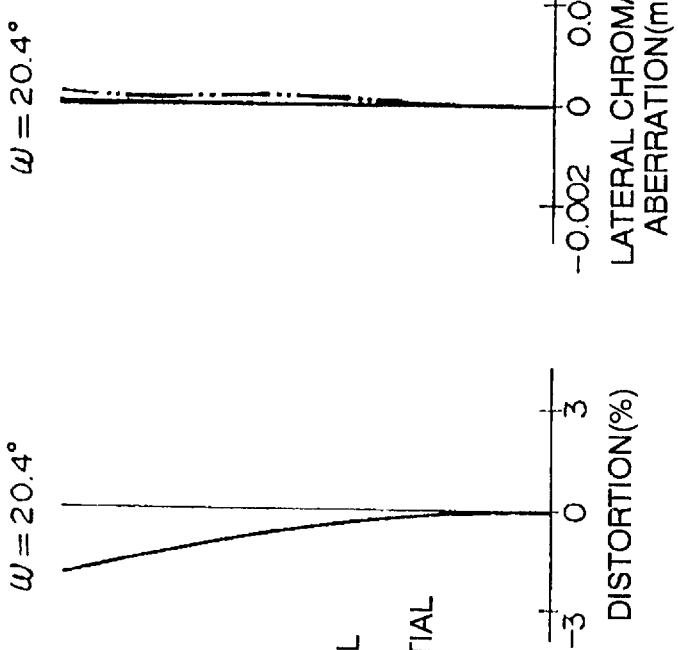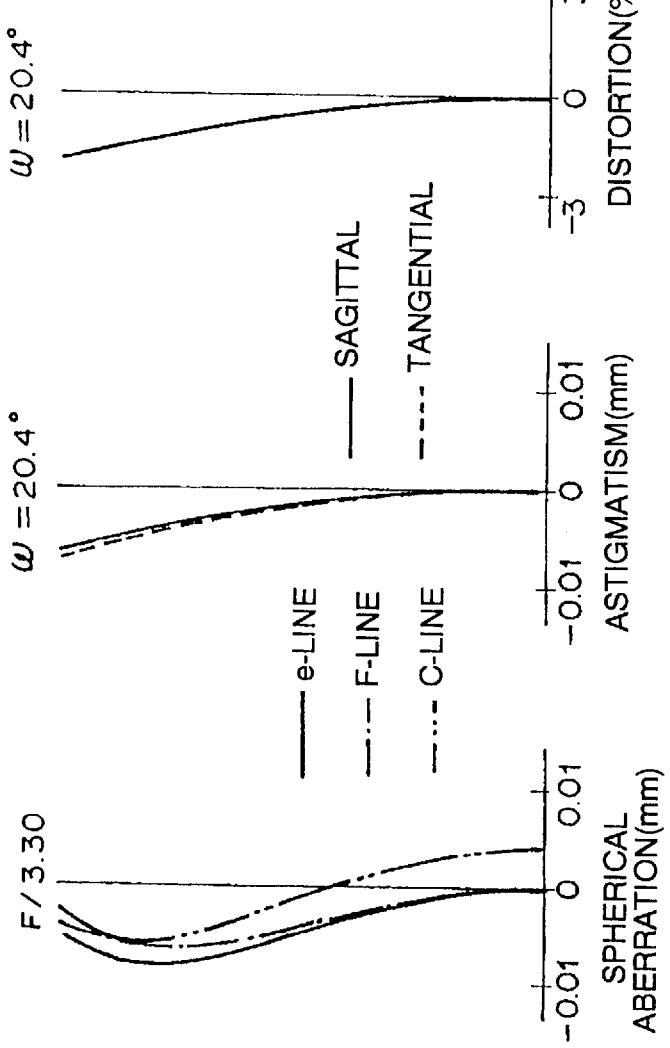

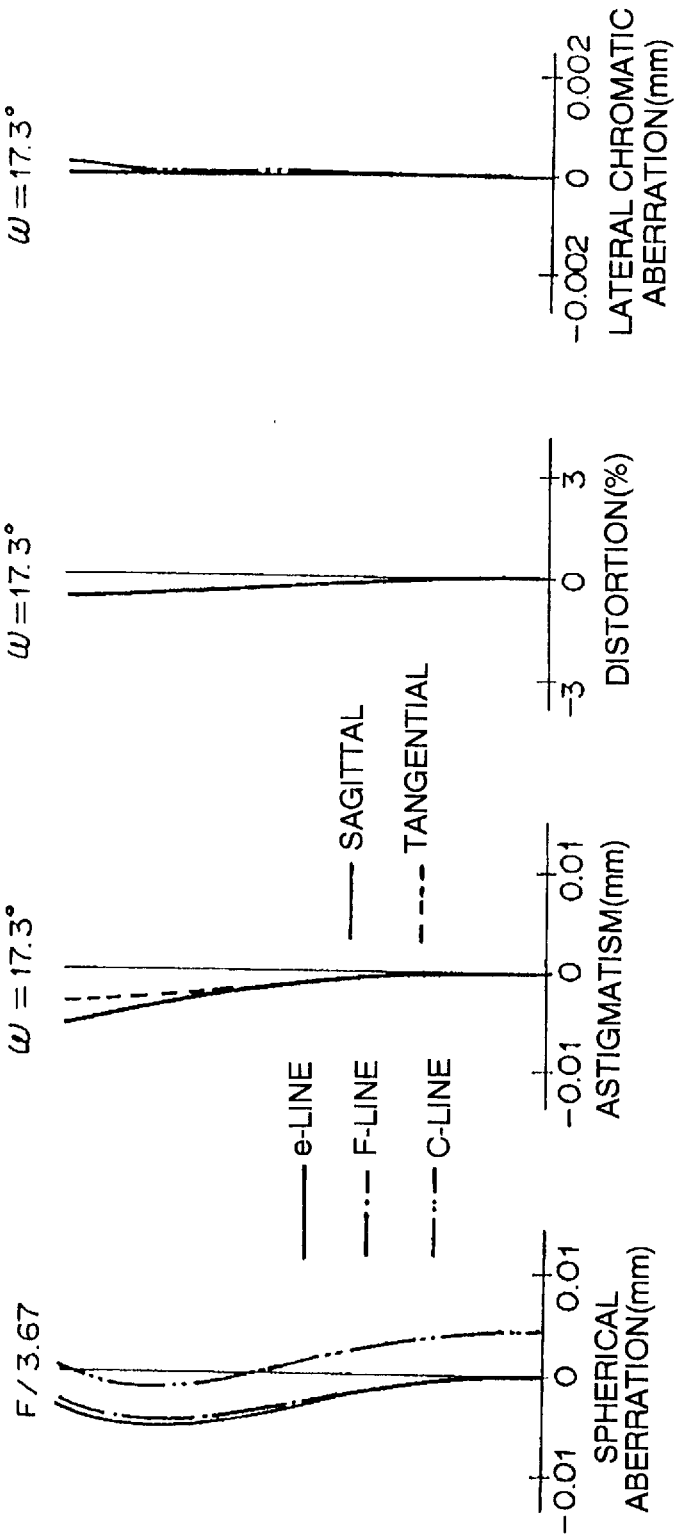

ZOOM LENS

BACKGROUND OF THE INVENTION

1. Field of the Invention

This invention relates to a zoom lens, and, more particularly, to a zoom lens for a projection zoom lens for a projection type of display apparatus.

2. Description of Related Art

In recent years, attention is directed to a projection type of display apparatus which has a liquid crystal display (LCD) device. A color image formed on the LCD device is magnified and projected onto a screen remote from the LCD device by means of a projection lens.

FIG. 1 schematically shows a practical structure of a video projector.

Referring to FIG. 1, three primary colors into which light rays 1a emanating from a light source 1 are separated by means of color separation prisms 2 and 4 and directed to liquid crystal display (LCD) devices 5, 6 and 7 on which images are displayed, respectively. Light rays 1a separated by the color separation prisms 2 and 4 are turned at right angles by reflection mirrors 3 and 9, respectively. Light rays 1 a transmitting through the liquid crystal display (LCD) devices 5, 6 and 7 and bearing three mono-color images are composed as a color image by means of color composing prisms 8 and 10 and then, magnified and projected by means of a projection lens 11 onto a screen (not shown) remote from the zoom lens 11.

Because the light rays 1a emanates at a certain divergent angle from the light source 1, and hence marginal light rays incident on each picture elements of the LCD devices 5–7 have large angles of incidence, in order for general LCD devices to prevent or significantly reduce unevenness in contrast and/or quantitative distribution of light, it is usual to use a micro lens array on a side of incidence of the LCD device so as to place micro lenses corresponding in position to picture elements of the LCD device.

In projection type display apparatuses, such as video projectors, which use an LCD device provided with a micro lens array, because a projection lens encounters aggravation of aperture efficiency if causing vignetting, the projection lens have to meet a demand for suitable performance as a telecentric optical system with respect to light rays on the side of the LCD device.

Typically, telecentric projection lenses suitable for projection type display apparatuses comprise three lens groups, two of which on the image end are axially movable relative to each other and relative to the third lens group. Such an telecentric projection lens is known from, for example, Japanese Unexamined Patent Publication No.7-13077. This telecentric projection lens shows a great change rate of spherical aberration during zooming and is still in need of a high degree of design freedom with respect to aberration correction.

SUMMARY OF THE INVENTION

It is an object of the invention to provide a zoom lens suitable used as a projection lens for a projection type of display system as well which prevents or significantly reduces fluctuations of aberrations, in particular a change rate of aberrations, during zooming while having high performance as a telecentric optical system with respect to light rays on the side of the LCD device of the display system.

It is another object of the invention to provide a zoom lens has a high degree of design freedom with respect to aberration correction.

The foregoing object of the invention is accomplished by providing a zoom lens comprising, in order from the image end to the object end, a negative power first lens group, a positive power second lens group, a positive power third lens group and a positive power fourth lens group. The first to third lens groups are axially movable in predetermined relation relative to one another and relative to the fourth lens group which is stationary to focus and vary the focal length of the zoom lens. The zoom lens satisfies the following condition:

$$1.6 < D_{34w}/F_w < 2.8$$

where $D_{34w}$ is the axial air distance the third and fourth lens groups of the zoom lens at the wide angle end position and $F_w$ is the focal length of the overall zoom lens at the wide angle end position.

The zoom lens is preferred to further satisfy the following conditions:

$$-1.5 < F_1/F_w < -0.5$$

$$0.8 < F_2/F_w < 2.0$$

$$1.8 < F_3/F_w < 3.8$$

$$0.5 < F_4/F_w < 4.0$$

where $F_1$, $F_2$, $F_3$ and $F_4$ are the focal length of the first, second, third and fourth lens groups, respectively.

The zoom lens may includes a single component of a bi-convex lens element for the fourth lens group and/or the second lens group.

BRIEF DESCRIPTION OF THE DRAWINGS

The above and other objects and features of the present invention will be understood from the following description of a specific embodiment thereof when considering in conjunction with the accompanying drawings, in which:

FIGS. 7A, 7B, 7C and 7D are graphical views showing spherical aberrations for e-line, F-line and C-line, astigmatism in sagittal and tangential planes, distortion and lateral chromatic aberrations, respectively, of the projection lens shown in FIG. 2 at the wide angle end;

FIGS. 8A, 8B, 8C and 8D are graphical views showing spherical aberrations for e-line, F-line and C-line, astigmatism in sagittal and tangential planes, distortion and lateral chromatic aberrations, respectively, of the projection lens shown in FIG. 2 at the intermediate focal length position;

FIGS. 9A, 9B, 9C and 9D are graphical views showing spherical aberrations for e-line, F-line and C-line, astigmatism in sagittal and tangential planes, distortion and lateral chromatic aberrations, respectively, of the projection lens shown in FIG. 2 at the telephoto end;

FIGS. 10A, 10B, 10C and 10D are graphical views showing spherical aberrations for e-line, F-line and C-line, astigmatism in sagittal and tangential planes, distortion and lateral chromatic aberrations, respectively, of the projection lens shown in FIG. 3 at the wide angle end;

FIGS. 11A, 11B, 11C and 11D are graphical views showing spherical aberrations for e-line, F-line and C-line, astigmatism in sagittal and tangential planes, distortion and lateral chromatic aberrations, respectively, of the projection lens shown in FIG. 3 at the intermediate focal length position;

FIGS. 12A, 12B, 12C and 12D are graphical views showing spherical aberrations for e-line, F-line and C-line, astigmatism in sagittal and tangential planes, distortion and lateral chromatic aberrations, respectively, of the projection lens shown in FIG. 3 at the telephoto end;

FIGS. 13A, 13B, 13C and 13D are graphical views showing spherical aberrations for e-line, F-line and C-line, astigmatism in sagittal and tangential planes, distortion and lateral chromatic aberrations, respectively, of the projection lens shown in FIG. 4 at the wide angle end;

FIGS. 14A, 14B, 14C and 14D are graphical views showing spherical aberrations for e-line, F-line and C-line, astigmatism in sagittal and tangential planes, distortion and lateral chromatic aberrations, respectively, of the projection lens shown in FIG. 4 at the intermediate focal length position;

FIGS. 15A, 15B, 15C and 15D are graphical views showing spherical aberrations for e-line, F-line and C-line, astigmatism in sagittal and tangential planes, distortion and lateral chromatic aberrations, respectively, of the projection lens shown in FIG. 4 at the telephoto end;

FIGS. 16A, 16B, 16C and 16D are graphical views showing spherical aberrations for e-line, F-line and C-line, astigmatism in sagittal and tangential planes, distortion and lateral chromatic aberrations, respectively, of the projection lens shown in FIG. 5 at the wide angle end;

FIGS. 17A, 17B, 17C and 17D are graphical views showing spherical aberrations for e-line, F-line and C-line, astigmatism in sagittal and tangential planes, distortion and lateral chromatic aberrations, respectively, of the projection lens shown in FIG. 5 at the intermediate focal length position;

FIGS. 18A, 18B, 18C and 18D are graphical views showing spherical aberrations for e-line, F-line and C-line, astigmatism in sagittal and tangential planes, distortion and lateral chromatic aberrations, respectively, of the projection lens shown in FIG. 5 at the telephoto end;

FIGS. 19A, 19B, 19C and 19D are graphical views showing spherical aberrations for e-line, F-line and C-line, astigmatism in sagittal and tangential planes, distortion and lateral chromatic aberrations, respectively, of the projection lens shown in FIG. 6 at the wide angle end;

FIGS. 20A, 20B, 20C and 20D are graphical views showing spherical aberrations for e-line, F-line and C-line, astigmatism in sagittal and tangential planes, distortion and lateral chromatic aberrations, respectively, of the projection lens shown in FIG. 6 at the intermediate focal length position.

DETAILED DESCRIPTION OF THE SPECIFIC EMBODIMENT

Figure 1:
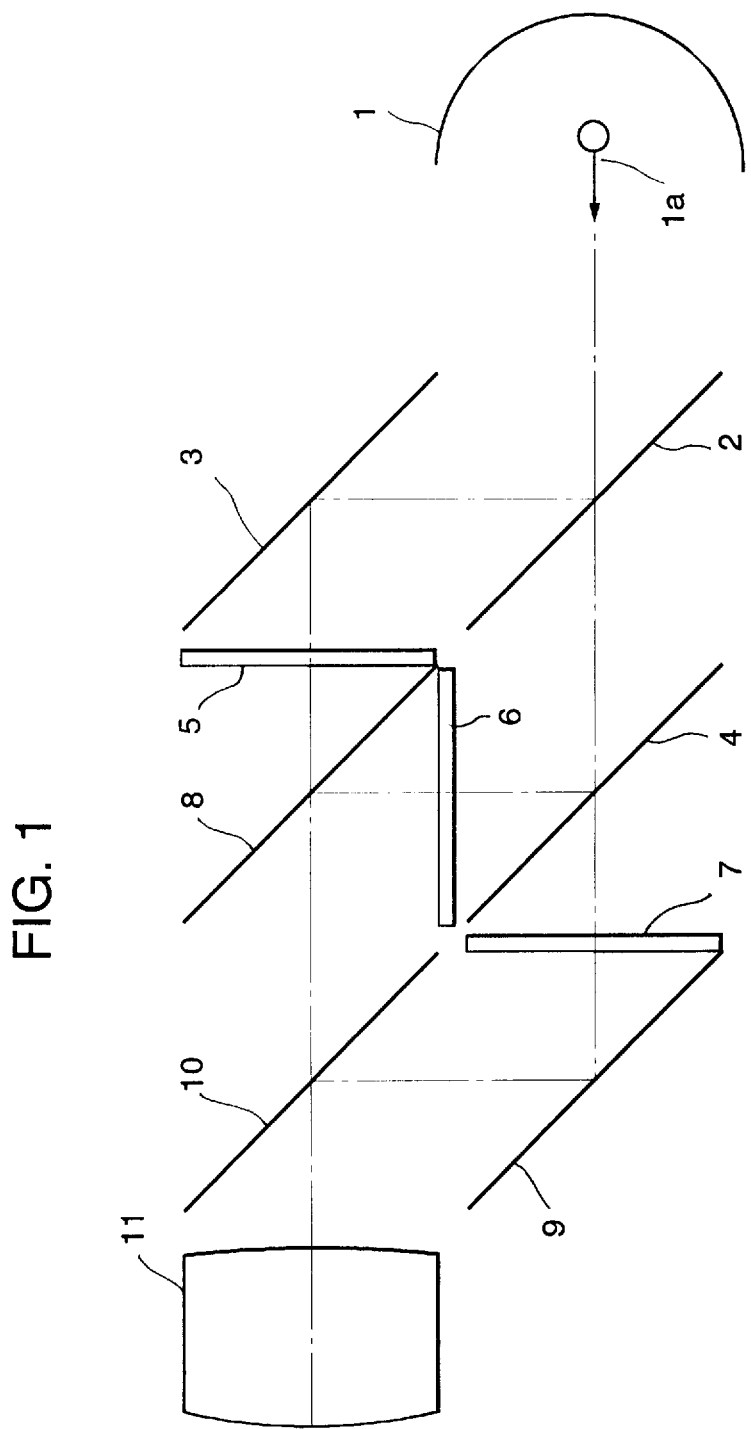
FIG. 1 is a diagrammatic side view of a typical liquid crystal type of video projector including a projection lens.
Figure 2:
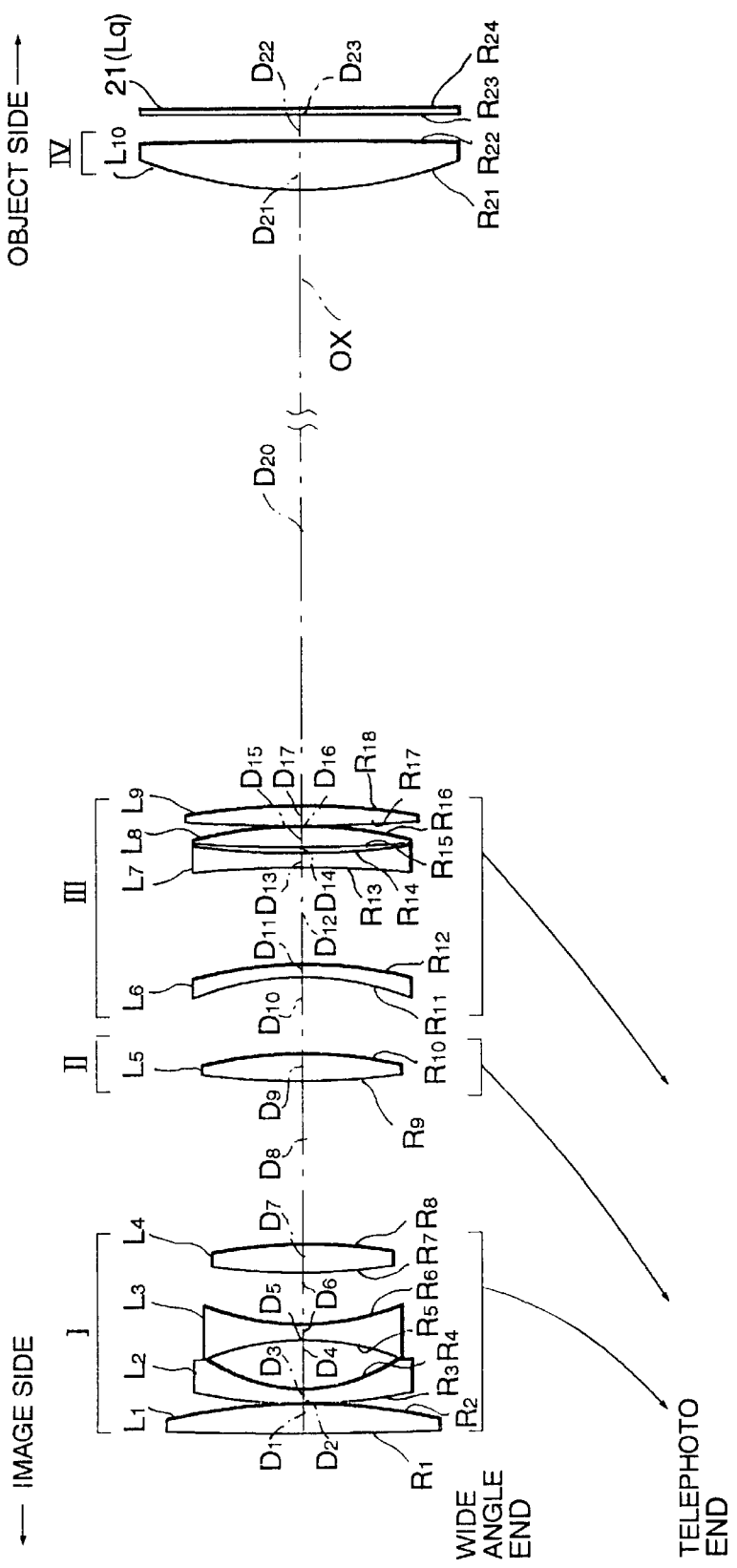
FIG. 2 is a diagrammatic side view of a basic optical structure of a zoom lens for the video projector according to an embodiment of the invention.

Referring to the drawings in detail, particularly to FIG. 2 showing a zoom lens at the wide angle end or the shortest focal length position embodying the invention which is incorporated as a projector lens in the video projector of the type having three LCD devices shown in FIG. 1, the zoom lens includes, in order from the image side or the side of magnified image to the object side or the side of reduced image, a negative power first lens group I, a positive power second lens group II, a positive power third lens group III, and a positive power fourth lens group IV. The first to third lens groups I, II and II are movable along the optical axis OX for focusing and varying the focal length of the entire lens. The fourth lens group IV is stationary. The first and second lens groups I and II are axially moved relative to each other and relative to the stationary lens group IV in a direction toward the image side so as to reduce the axial distance gradually during zooming from the wide angle end or the shortest focal length position to the telephoto end or the longest focal length position. The second and third lens groups II and III are axially moved relative to each other and relative to the stationary lens group IV in a direction toward the image side so as to increase the axial distance during zooming from the wide angle end to the telephoto end.

The first lens group I includes four components, i.e. a positive bi-convex lens element $L_1$ having a convex object side surface of a strong curvature, a negative meniscus lens element $L_2$ having a convex image side surface, a negative bi-concave lens element $L_3$ having an image side surface of a strong curvature and a positive bi-convex lens element $L_4$ arranged in this order from the image side. The second lens group II includes a single component comprising a bi-convex lens element $L_5$ having an image side surface of a strong curvature. The third lens group III includes four components, i.e. a negative meniscus lens element $L_6$ having an object side convex surface, a negative bi-concave lens element $L_7$ having an object side surface of a strong curvature, a positive bi-convex lens element $L_8$ having an object side surface of a strong curvature, and a positive bi-convex lens element $L_9$ having an object side surface of a strong curvature arranged in this order from the image side. The fourth lens group IV includes a single component comprising a piano-convex lens element $L_{10}$ having an image side convex surface.

Although the zoom lens includes three fourth lens groups IV which are disposed in front of the respective LCD devices 5, 6 and 7, only one of the fourth lens groups IV is shown together with an LCD device (Lq) 21 by which the LCD devices 5, 6 and 7 are represented.

Figure 3:
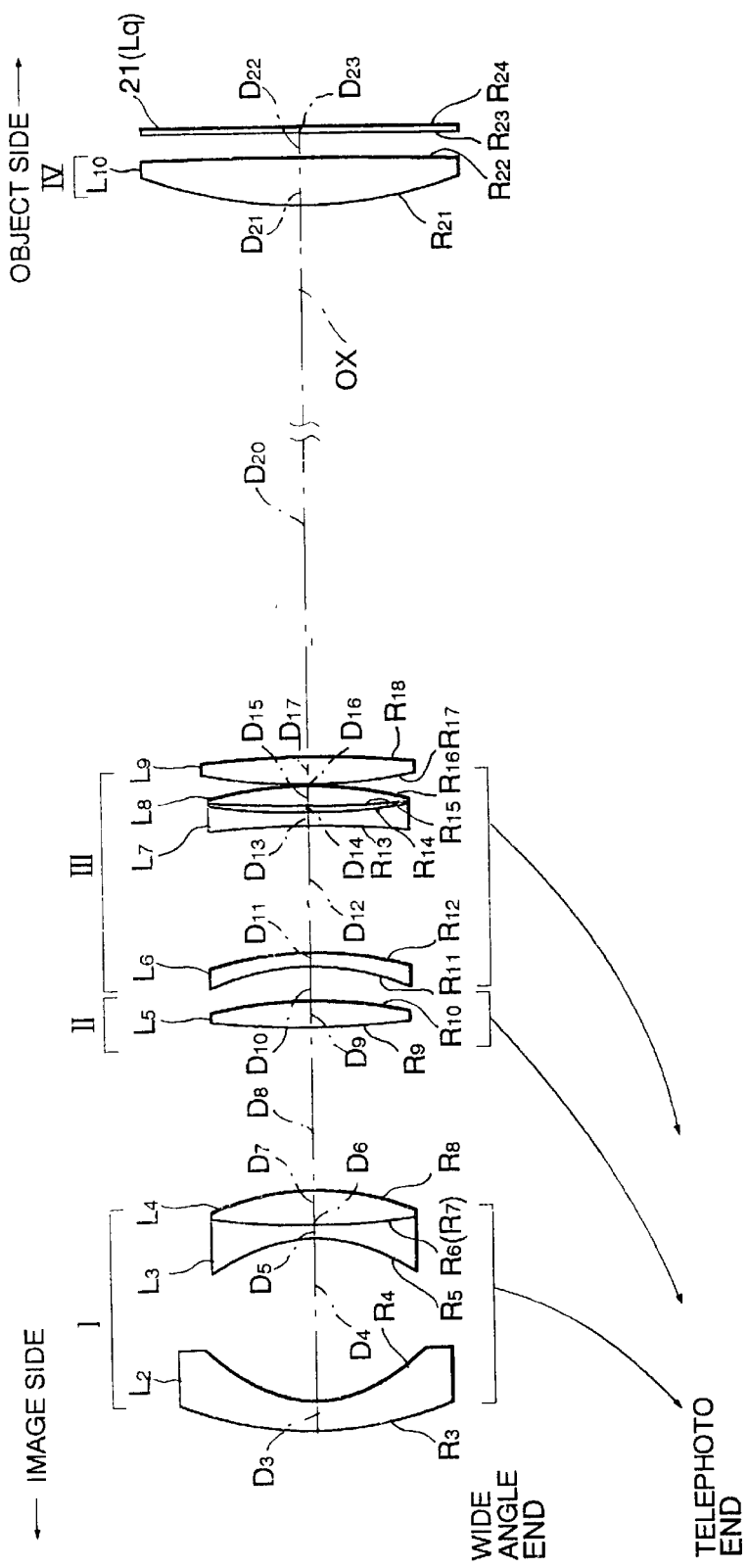
FIG. 3 is a diagrammatic side view of a basic optical structure of a zoom lens for the video projector according to another embodiment of the invention.

FIG. 3 shows a zoom lens at the wide angle end or the shortest focal length position according to another embodiment of the invention which is incorporated as a projector lens in the video projector of the type having three LCD devices shown in FIG. 1. The zoom lens includes, in order from the image side or the side of magnified image to the object side or the side of reduced image, a negative power first lens group I, a positive power second lens group II, a positive power third lens group II, and a positive power fourth lens group IV. The first to third lens groups I, II and II are movable along the optical axis OX for focusing and varying the focal length of the entire lens. The fourth lens group IV is stationary. The first and second lens groups I and II are axially moved relative to each other and relative to the stationary lens group IV in a direction toward the image side so as to reduce the axial distance gradually during zooming from the wide angle end or the shortest focal length position to the telephoto end or the longest focal length position. The second and third lens groups II and III are axially moved relative to each other and relative to the stationary lens group IV in a direction toward the image side so as to increase the axial distance during zooming from the wide angle end to the telephoto end.

The first lens group I, which is different in the number of components from the first lens group I in the previous embodiment, includes three components, i.e. a negative meniscus lens element $L_1$ having a convex image side aspherical surface, an overall negative doublet comprising a negative bi-concave lens element $L_2$ having an image side surface of a strong curvature and a positive bi-convex lens element $L_3$ arranged in this order from the image side. The second lens group II includes a single component comprising a bi-convex lens element $L_5$ having an image side surface of a strong curvature. The third lens group III includes four components, i.e. a negative meniscus lens element $L_6$ having an object side convex surface, a negative bi-concave lens element $L_7$ having an object side surface of a strong curvature, a positive bi-concvex lens element $L_8$ having an object side surface of a strong curvature, and a positive bi-concvex lens element $L_9$ having an image side surface of a strong curvature arranged in this order from the image side. The fourth lens group IV includes a single component comprising a plano-convex lens element $L_{10}$ having an image side convex surface.

Aspherical surface may be defined by the following equation:

$$X=CY^2/[1+(1-KC^2Y^2)^{1/2}]+a_4Y^4+a_6Y^6+a_8Y^8+a_{10}Y^{10}$$

where

X is the surface sag at a semi-aperture distance Y from the optical axis OX of the zoom lens;

C is the curvature of a lens surface which is equal to the reciprocal of the radius on the optical axis OX;

K is a conic constant; and $a_4$, $a_6$, $a_8$ and $a_{10}$ are aspherical coefficients.

Figure 4:
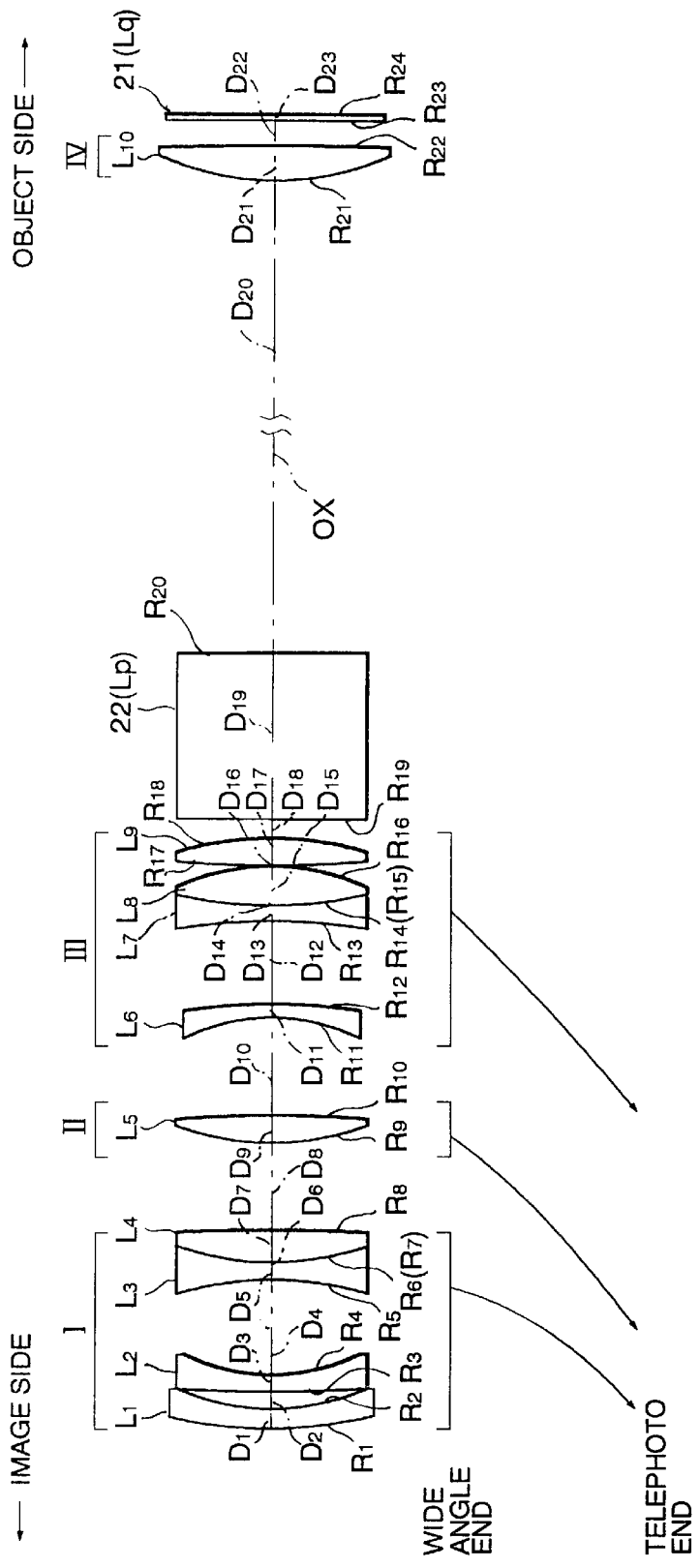
FIG. 4 is a diagrammatic side view of a basic optical structure of a zoom lens for the video projector according to another embodiment of the invention.

FIG. 4 shows a zoom lens at the wide angle end or the shortest focal length position according to another embodiment of the invention which is preferably incorporated as a projector lens in the video projector of the type having two projection optical systems. Each projection optical system has the same structure comprising optical elements 1 through 10 shown in FIG. 1, and includes another set of fourth lens groups IV. This type of video projector projects a considerably bright image on the screen.

The zoom lens includes, in order from the image side or the side of magnified image to the object side or the side of reduced image, a negative power first lens group I, a positive power second lens group II, a positive power third lens group II, and a positive power fourth lens group IV. The first to third lens groups I, II and II are movable along the optical axis OX for focusing and varying the focal length of the entire lens. The fourth lens group IV is stationary. The first and second lens groups I and II are axially moved relative to each other and relative to the stationary lens group IV in a direction toward the image side so as to reduce the axial distance gradually during zooming from the wide angle end or the shortest focal length position to the telephoto end or the longest focal length position. The second and third lens groups II and III are axially moved relative to each other and relative to the stationary lens group IV in a direction toward the image side so as to increase the axial distance during zooming from the wide angle end to the telephoto end. Further, the zoom lens includes a stationary optical element Lp between the third and fourth lens groups III and IV. The optical axis OX of the other projection optical system including the forth lens groups IV, which is extends perpendicularly to a plane of the figure and turned at a right angle by means of the optical element Lp so as to compose two images transmitted by the two projection optical systems.

Because the two projection optical systems have the same optical structure, the following description will be directed to only one of them which has an optical axis aligned in straight with the optical axis of the zoom lens.

The first lens group I includes four components, i.e. a negative meniscus lens element $L_1$ having a convex image side surface, a negative meniscus lens element $L_2$ having a convex image side surface and an overall negative doublet comprising a negative bi-concave lens element $L_3$ having an object side surface of a strong curvature and a negative plano-concvex lens element $L_4$ having an image side convex surface arranged in this order from the image side. The second lens group II includes a single component comprising a bi-convex lens element $L_5$ having an object side surface of a strong curvature. The third lens group III includes four components, i.e. a negative meniscus lens element $L_6$ having an object side convex surface, a doublet comprising a negative bi-concave lens element $L_7$ having an object side surface of a strong curvature and a positive bi-concvex lens element $L_8$ having an object side surface of a strong curvature, and a positive bi-concvex lens element $L_9$ having an object side surface of a strong curvature arranged in this order from the image side. The fourth lens group IV includes a single component comprising a planoconvex lens element $L_{10}$ having an image side convex surface.

Figure 5:
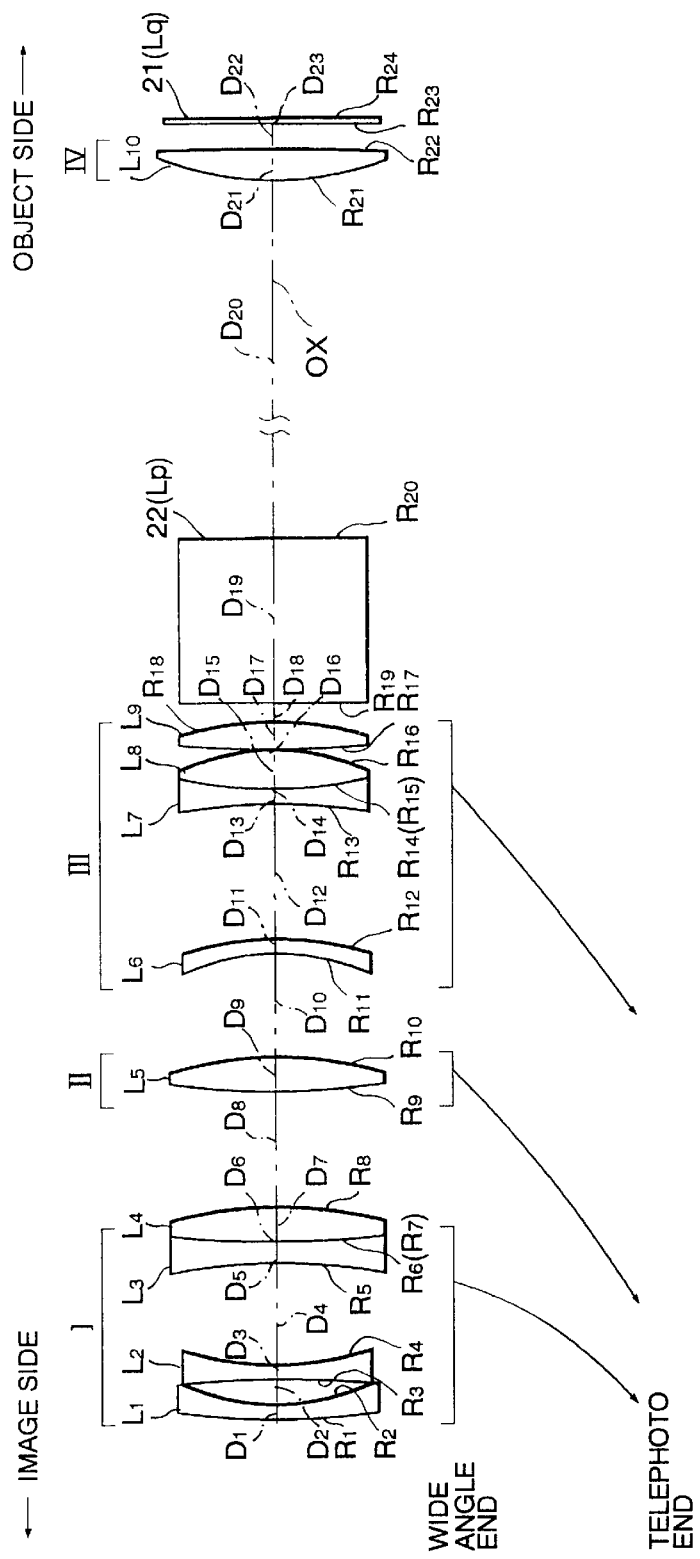
FIG. 5 is a diagrammatic side view of a basic optical structure of a zoom lens for the video projector according to another embodiment of the invention.

FIG. 5 shows a zoom lens at the wide angle end or the shortest focal length position according to another embodiment of the invention which is preferably incorporated as a projector lens in the video projector of the type having two projection optical systems. The zoom lens includes, in order from the image side or the side of magnified image to the object side or the side of reduced image, a negative power first lens group I, a positive power second lens group II, a positive power third lens group III, and a positive power fourth lens group IV. The first to third lens groups I, II and II are movable along the optical axis OX for focusing and varying the focal length of the entire lens. The fourth lens group IV is stationary. The first and second lens groups I and II are axially moved relative to each other and relative to the stationary lens group IV in a direction toward the image side so as to reduce the axial distance gradually during zooming from the wide angle end or the shortest focal length position to the telephoto end or the longest focal length position. The second and third lens groups II and III are axially moved relative to each other and relative to the stationary lens group IV in a direction toward the image side so as to increase the axial distance during zooming from the wide angle end to the telephoto end. Further, the zoom lens includes a stationary optical element Lp between the third and fourth lens groups III and IV. The first to fourth lens groups I–IV has almost similar lens components, namely first to tenth lens elements $L_1$–$L_{10}$, arranged in order from the image side or the side of magnified image to the object side or the side of reduced image, to those of the zoom lens shown in FIG. 4.

However, different from the zoom lens shown in FIG. 5, the zoom lens includes a second component comprising a bi-concave lens element $L_2$ having an object side surface of a strong curvature and a fourth component comprising a bi-convex lens element $L_2$ having an image side surface of a strong curvature in the first lens group I.

Figure 6:
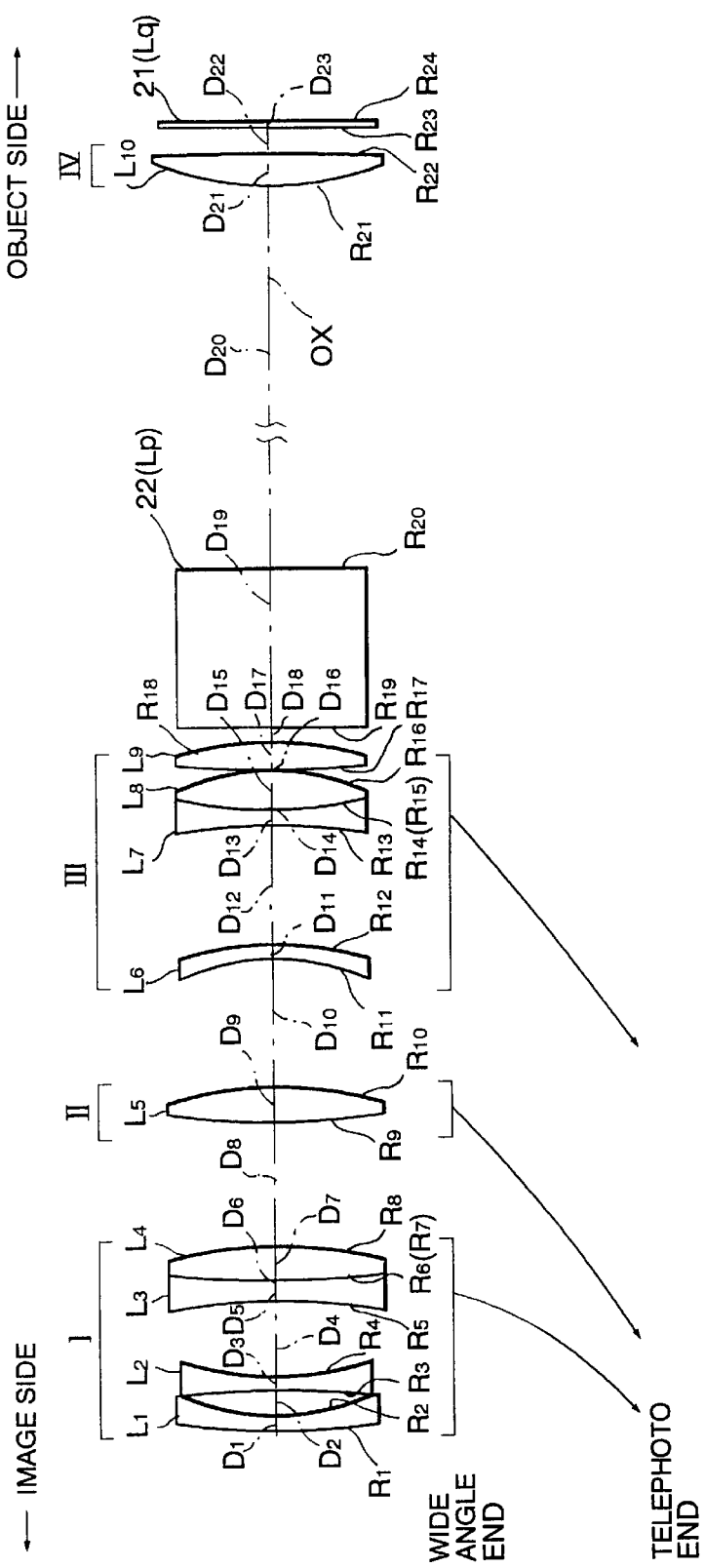
FIG. 6 is a diagrammatic side view of a basic optical structure of a zoom lens for the video projector according to still another embodiment of the invention.
Figures 21A, 21B, 21C, 21D:
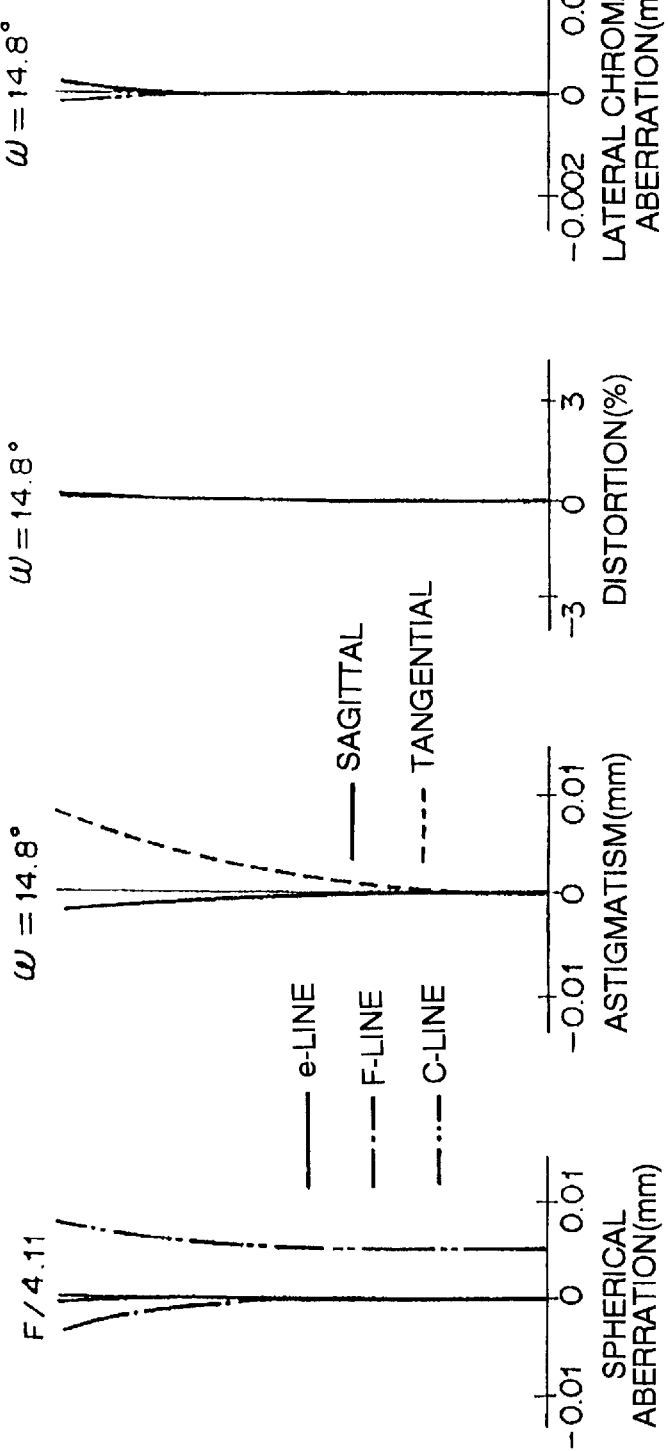
FIGS. 21A, 21B, 21C and 21D are graphical views showing spherical aberrations for e-line, F-line and C-line, astigmatism in sagittal and tangential planes, distortion and lateral chromatic aberrations, respectively, of the projection lens shown in FIG. 6 at the telephoto end.

FIG. 6 shows a zoom lens at the wide angle end or the shortest focal length position according to another embodiment of the invention which is preferably incorporated as a projector lens in the video projector of the type having two projection optical systems. The zoom lens includes, in order from the image side or the side of magnified image to the object side or the side of reduced image, a negative power first lens group I, a positive power second lens group II, a positive power third lens group III, and a positive power fourth lens group IV. The first to third lens groups I, 11 and 11 are movable along the optical axis OX for focusing and varying the focal length of the entire lens. The fourth lens group IV is stationary. The first and second lens groups I and II are axially moved relative to each other and relative to the stationary lens group IV in a direction toward the image side so as to reduce the axial distance gradually during zooming from the wide angle end or the shortest focal length position to the telephoto end or the longest focal length position. The second and third lens groups II and III are axially moved relative to each other and relative to the stationary lens group IV in a direction toward the image side so as to increase the axial distance during zooming from the wide angle end to the telephoto end. Further, the zoom lens includes a stationary optical element Lp between the third and fourth lens groups III and IV. The first to fourth lens groups I–IV has almost similar lens components, namely first to tenth lens elements $L_1$–$L_{10}$, arranged in order from the image side or the side of magnified image to the object side or the side of reduced image, to those of the zoom lens shown in FIG. 5.

Zoom lens in all embodiments of the invention must satisfy the following condition (I):

$$1.6 < D_{34w}/F_w < 2.8 \quad \text{(I)}$$

where $D_{34w}$ is the axial air distance (as measured by optical path length) between the third and fourth lens groups III and IV of the zoom lens at the wide angle end position; and $F_w$ is the focal length of the overall zoom lens at the wide angle end position. Further, the zoom lens in all embodiments of the invention satisfy the following conditions (II)–(V):

$$-1.5 < F_1/F_w < -0.5 \quad \text{(II)}$$

$$0.8 < F_2/F_w < 2.0 \quad \text{(III)}$$

$$1.8 < F_3/F_w < 3.8 \quad \text{(IV)}$$

$$0.5 < F_4/F_w < 4.0 \quad \text{(V)}$$

where $F_1$ is the focal length of the overall first lens group I;

$F_2$ is the focal length of the overall second lens group II;

$F_3$ is the focal length of the overall third lens group III; and $F_4$ is the focal length of the overall fourth lens group IV.

The zoom lens having the first to third lens groups I–III which are movable relatively to one another provides a reduced rate of change in spherical aberration during zooming and an increased degree of design freedom in connection with aberration correction. Furthermore, the zoom lens satisfying the conditions remains the optical performance thereof as a telecentric optical system with respect to light rays on the object side.

The parameters set forth are necessary for suitably balancing aberrations of the zoom lens and lens powers of the lens groups, and maintaining the optical performance of the zoom lens as a telecentric optical system. Satisfaction of these conditions as set forth above ensues compactness of the zoom lens with an appropriate axial air space for incorporation of an image composing optical element while maintaining well balanced aberrations and the optical performance of the zoom lens as a telecentric optical system.

First condition (I) yields compactness of the zoom lens. If the lower limit of the ratio of $D_{34w}/F_w$ is exceeded, the axial distance between the third and fourth lens groups III and IV is shortened undesirable for the optical path composing element (Lp) 22 to be put in the zoom lens. On the other hand, if the upper limit of the ratio of $D_{34w}/F_w$ is exceeded, the third lens group III must include at least one of components having a large diameter which always causes an adverse effect of expensive production costs and/or hardness of aberration correction.

Second to fourth parameters provide the relationships between the focal length of the zoom lens and the composite focal length of the first to fourth lens groups (I)–(IV) which yields the distribution of power for compactness of the zoom lens. If the lower limit of the ratio of $F_1/F_w$ is exceeded, the first lens group II has an weakened negative power, resulting in a shortened axial distance between the third and fourth lens groups III and IV. On the other hand, if the upper limit of the ratio of $F_1/F_w$ is exceeded, the height of light rays from the optical axis is increased on the side after the third lens group III with an adverse effect of inducing aggravation of aberrations of the zoom lens.

If the lower limit of the ratio of $F_2/F_w$ is exceeded, the second lens group II has an enhanced positive power, resulting in a shortened axial distance between the third and fourth lens groups III and IV. On the other hand, if the upper limit of the ratio of $F_1/F_w$ is exceeded, the second lens group I induces aggravation of aberrations with respect to on-axial light rays.

If the lower limit of the ratio of $F_3/F_w$ is exceeded, the third lens group III has an enhanced positive power, resulting in a shortened axial distance between the third and fourth lens groups III and IV. On the other hand, if the upper limit of the ratio of $F_3/F_w$ is exceeded, the third lens group III has a weakened negative power with an adverse effect of inducing aggravation of aberrations and/or increasing the distance of movement of the third lens group III which is undesirably for the overall compactness of the zoom lens.

The fifth parameter provides the relationships between the focal length of the zoom lens and the composite focal length of the fourth lens group (IV) which yields the optical performance of the zoom lens as a telecentric optical system. If either the lower limit or the upper limit of the ratio of $F_4/F_w$ is exceeded, the zoom lens is hard to maintain the optical performance as a telecentric optical system.

In the following tables, various embodiments of the invention are set forth for various equivalent focal length ranges, with the parameters of the invention. In the following prescription tables, the reference L followed by an Arabic numeral indicates the lens element progressively from the image end to the object end of the projection lens. The reference radius numbers R are the progressive surface radii of the elements of the projection lens. Positive surface radii are struck from the right of the surface of the element on the optical axis OX, and negative surface radii are struck from the left of the surface of the element on the optical axis OX. The reference distance numbers D are the progressive axial air distances between adjacent surfaces, and Z1, Z2 and Z3 are variable air spacings at the wide angle end (the shortest focal length position), the intermediate position and the telephoto end (the longest focal length position), respectively. Nd is the index of refraction of the lens elements. νd is the dispersion of the lens elements as measured by the Abbe number. The spaces Z are spaces between lens groups which vary with change in equivalent focal length.

A projection lens as shown in FIG. 2 scaled to F numbers of 3.50, 3.91 and 4.47 at the wide angle end (the shortest focal length position), the intermediate position and the telephoto end (the longest focal length position), respectively, and image angles (2ω) of 53.4°, 43.0° and 34.6° at the wide angle end (the shortest focal length position), the intermediate position and the telephoto end (the longest focal length position), respectively, is substantially described in Table I.

TABLE I

| Element | Radius of Curvature (mm) | Axial distance Between Surfaces (mm) | Nd | νd |
|---|---|---|---|---|
| $L_1$ | $R_1 = 3.803$ | $D_1 = 0.088$ | 1.62299 | 58.1 |
|  | $R_2 = -2.063$ | $D_2 = 0.002$ |  |  |
| $L_2$ | $R_3 = 1.764$ | $D_3 = 0.045$ | 1.62041 | 60.4 |
|  | $R_4 = 0.501$ | $D_4 = 0.170$ |  |  |
| $L_3$ | $R_5 = -0.564$ | $D_5 = 0.034$ | 1.63854 | 55.4 |
|  | $R_6 = 1.041$ | $D_6 = 0.161$ |  |  |
| $L_4$ | $R_7 = 1.623$ | $D_7 = 0.075$ | 1.60342 | 38.0 |
|  | $R_8 = -1.380$ | $D_8 = Z1$ |  |  |
| $L_5$ | $R_9 = 1.653$ | $D_9 = 0.069$ | 1.63854 | 23.8 |
|  | $R_{10} = -2.077$ | $D_{10} = Z2$ |  |  |
| $L_6$ | $R_{11} = -0.806$ | $D_{11} = 0.034$ | 1.84666 | 23.8 |
|  | $R_{12} = -1.103$ | $D_{12} = 0.294$ |  |  |
| $L_7$ | $R_{13} = -14.473$ | $D_{13} = 0.037$ | 1.80518 | 25.5 |
|  | $R_{14} = 1.709$ | $D_{14} = 0.019$ |  |  |
| $L_8$ | $R_{15} = 4.925$ | $D_{15} = 0.076$ | 1.58913 | 61.2 |
|  | $R_{16} = -1.184$ | $D_{16} = 0.002$ |  |  |
| $L_9$ | $R_{17} = 7.027$ | $D_{17} = 0.062$ | 1.62041 | 60.4 |
|  | $R_{18} = -1.800$ | $D_{20} = Z3$ |  |  |
| $L_{10}$ | $R_{21} = 1.370$ | $D_{21} = 0.132$ | 1.51633 | 64.1 |
|  | $R_{22} = \infty$ | $D_{22} = 0.113$ |  |  |
| $L_q$ | $R_{23} = \infty$ | $D_{23} = 0.023$ | 1.51633 | 64.1 |
|  | $R_{24} = \infty$ |  |  |  |

| Zoom Spacing | | | |
|---|---|---|---|
|  | Z1 (mm) | Z2 (mm) | Z3 (mm) |
| WAE | 0.464 | 0.216 | 1.981 |
| INT | 0.238 | 0.247 | 2.327 |
| TPE | 0.056 | 0.300 | 2.774 |

The zoom lens depicted in FIG. 2 and described in the above prescription Table I has the parameters (I)–(V) as follows:

| $D_{34W}/F_W$ | $F_1/F_W$ | $F_2/F_W$ | $F_3/F_W$ | $F_4/F_W$ |
|---|---|---|---|---|
| 1.98 | −0.98 | 1.45 | 2.80 | 2.64 |

As apparent from the above, the zoom lens shown in FIG. 2 satisfies all of the conditions (I)–(V).

Spherical aberrations for e-line, F-line and C-line, astigmatism in sagittal and tangential planes, distortion and lateral chromatic aberrations of the projection lens shown in FIG. 2 at the wide angle end, at the intermediate focal length position and at the telephoto end are shown in FIGS. 7A–7D, FIGS. 8A–8D and FIGS. 9A–9D, respectively. As apparent from FIGS. 7A–7D, 8A–8D and 9A–9D, the zoom lens has well balanced aberrations over the range of zooming and remains the overall compactness with an axial air space for the optical path composing element (Lp) 22 remained broad.

A projection lens as shown in FIG. 3 scaled to F numbers of 3.26, 3.54 and 3.89 at the wide angle end (the shortest focal length position), the intermediate position and the telephoto end (the longest focal length position), respectively, and image angles (2ω) of 53.4°, 42.8° and 34.6° at the wide angle end (the shortest focal length position), the intermediate position and the telephoto end (the longest focal length position), respectively, is substantially described in Table II.

TABLE II

| Element | Radius of Curvature (mm) | Axial distance Between Surfaces (mm) | Nd | νd |
|---|---|---|---|---|
| $L_2$ | $R_3 = 1.525$ | $D_3 = 0.065$ | 1.49018 | 57.8 |
|  | $R_4 = 0.460$ | $D_4 = 0.476$ |  |  |
| $L_3$ | $R_5 = -0.544$ | $D_5 = 0.034$ | 1.51680 | 64.2 |
|  | $R_6 = 1.399$ | $D_6 = 0.0001$ |  |  |
| $L_4$ | $R_7 = 1.326$ | $D_7 = 0.088$ | 1.70154 | 41.1 |
|  | $R_8 = -1.326$ | $D_8 = Z1$ |  |  |
| $L_5$ | $R_9 = 1.606$ | $D_9 = 0.072$ | 1.65844 | 50.8 |
|  | $R_{10} = -2.544$ | $D_{10} = Z2$ |  |  |
| $L_6$ | $R_{11} = -0.991$ | $D_{11} = 0.034$ | 1.51742 | 52.2 |
|  | $R_{12} = -1.718$ | $D_{12} = 0.382$ |  |  |
| $L_7$ | $R_{13} = -3.361$ | $D_{13} = 0.037$ | 1.84666 | 23.8 |
|  | $R_{14} = 2.029$ | $D_{14} = 0.022$ |  |  |
| $L_8$ | $R_{15} = 9.748$ | $D_{15} = 0.083$ | 1.62041 | 60.4 |
|  | $R_{16} = -1.063$ | $D_{16} = 0.002$ |  |  |
| $L_9$ | $R_{17} = 1.963$ | $D_{17} = 0.070$ | 1.62299 | 58.1 |
|  | $R_{18} = -3.454$ | $D_{20} = Z3$ |  |  |
| $L_{10}$ | $R_{21} = 1.367$ | $D_{21} = 0.132$ | 1.51633 | 64.1 |
|  | $R_{22} = \infty$ | $D_{22} = 0.113$ |  |  |
| $L_q$ | $R_{23} = \infty$ | $D_{23} = 0.023$ | 1.51633 | 64.1 |
|  | $R_{24} = \infty$ |  |  |  |

TABLE II-continued

Zoom Spacing

|     | Z1 (mm) | Z2 (mm) | Z3 (mm) |
|-----|---------|---------|---------|
| WAE | 0.475   | 0.0966  | 1.996   |
| INT | 0.243   | 0.156   | 2.337   |
| TPE | 0.056   | 0.207   | 2.777   |

Aspherical Surface: $R_3$
Conic Constant and Aspherical Coefficient

|       | K      | $a_4$       | $a_6$       | $a_8$       | $a_{10}$    |
|-------|--------|-------------|-------------|-------------|-------------|
| $R_3$ | 1.0000 | 0.5474E+00  | 0.1967E+00  | 0.1500E+01  | 0.8929E+00  |

The zoom lens depicted in FIG. 3 and described in the above prescription Table II has the parameters (I)–(V) as follows:

| $D_{34W}/F_W$ | $F_1/F_W$ | $F_2/F_W$ | $F_3/F_W$ | $F_4/F_W$ |
|---------------|-----------|-----------|-----------|-----------|
| 2.00          | -1.00     | 1.50      | 2.63      | 2.64      |

As apparent from the above, the zoom lens shown in FIG. 3 satisfies all of the conditions (I)–(V).

Spherical aberrations for e-line, F-line and C-line, astigmatism in sagittal and tangential planes, distortion and lateral chromatic aberrations of the projection lens shown in FIG. 3 at the wide angle end, at the intermediate focal length position and at the telephoto end are shown in FIGS. 10A–10D, FIGS. 11A–11D and FIGS. 12A–12D, respectively. As apparent from FIGS. 10A–10D, 11A–11D and 12A–12D, the zoom lens has well balanced aberrations over the range of zooming and remains the overall compactness with an axial air space for the optical path composing element (Lp) 22 remained broad.

A projection lens as shown in FIG. 4 scaled to F numbers of 3.82, 4.26 and 4.76 at the wide angle end (the shortest focal length position), the intermediate position and the telephoto end (the longest focal length position), respectively, and image angles (2ω) of 40.2°, 34.4° and 29.4° at the wide angle end (the shortest focal length position), the intermediate position and the telephoto end (the longest focal length position), respectively, is substantially described in Table III.

TABLE III

| Element | Radius of Curvature (mm) | Axial distance Between Surfaces (mm) | Nd      | νd   |
|---------|--------------------------|--------------------------------------|---------|------|
| $L_1$   | $R_1$ = 1.070            |                                      |         |      |
|         |                          | $D_1$ = 0.058                        | 1.80518 | 25.5 |
|         | $R_2$ = 0.593            |                                      |         |      |
|         |                          | $D_2$ = 0.058                        |         |      |
| $L_2$   | $R_3$ = 1.931            |                                      |         |      |
|         |                          | $D_3$ = 0.058                        | 1.68893 | 31.2 |
|         | $R_4$ = 0.587            |                                      |         |      |
|         |                          | $D_4$ = 0.304                        |         |      |
| $L_3$   | $R_5$ = -1.602           |                                      |         |      |
|         |                          | $D_5$ = 0.058                        | 1.51823 | 58.9 |
|         | $R_6$ = 0.760            |                                      |         |      |
|         |                          | $D_6$ = 0                            |         |      |
| $L_4$   | $R_7$ = 0.760            |                                      |         |      |
|         |                          | $D_7$ = 0.097                        | 1.84666 | 23.8 |
|         | $R_8$ = ∞                |                                      |         |      |
|         |                          | $D_8$ = Z1                           |         |      |
| $L_5$   | $R_9$ = 2.012            |                                      |         |      |
|         |                          | $D_9$ = 0.075                        | 1.70154 | 41.1 |

TABLE III-continued

|          | $R_{10}$ = -1.566  |                   |         |      |
|----------|--------------------|-------------------|---------|------|
|          |                    | $D_{10}$ = Z2     |         |      |
|          | $R_{11}$ = -0.678  |                   |         |      |
| $L_6$    |                    | $D_{11}$ = 0.044  | 1.69895 | 30.0 |
|          | $R_{12}$ = -1.584  |                   |         |      |
|          |                    | $D_{12}$ = 0.262  |         |      |
|          | $R_{13}$ = -2.213  |                   |         |      |
| $L_7$    |                    | $D_{13}$ = 0.047  | 1.80518 | 25.5 |
|          | $R_{14}$ = 1.567   |                   |         |      |
|          |                    | $D_{14}$ = 0      |         |      |
|          | $R_{15}$ = 1.567   |                   |         |      |
| $L_8$    |                    | $D_{15}$ = 0.155  | 1.51680 | 64.2 |
|          | $R_{16}$ = -0.772  |                   |         |      |
|          |                    | $D_{16}$ = 0.003  |         |      |
|          | $R_{17}$ = 4.436   |                   |         |      |
| $L_9$    |                    | $D_{17}$ = 0.076  | 1.65844 | 50.8 |
|          | $R_{18}$ = -1.549  |                   |         |      |
|          |                    | $D_{18}$ = Z3     |         |      |
|          | $R_{19}$ = ∞       |                   |         |      |
| $L_p$    |                    | $D_{19}$ = 0.580  | 1.51633 | 64.1 |
|          | $R_{20}$ = ∞       |                   |         |      |
|          |                    | $D_{20}$ = 1.832  |         |      |
|          | $R_{21}$ = 1.016   |                   |         |      |
| $L_{10}$ |                    | $D_{21}$ = 0.098  | 1.51680 | 64.2 |
|          | $R_{22}$ = ∞       |                   |         |      |
|          |                    | $D_{22}$ = 0.084  |         |      |
|          | $R_{23}$ = ∞       |                   |         |      |
| $L_q$    |                    | $D_{23}$ = 0.017  | 1.51633 | 64.1 |
|          | $R_{24}$ = ∞       |                   |         |      |

Zoom Spacing

|     | Z1 (mm) | Z2 (mm) | Z3 (mm) |
|-----|---------|---------|---------|
| WAE | 0.296   | 0.323   | 0.073   |
| INT | 0.158   | 0.332   | 0.358   |
| TPE | 0.040   | 0.337   | 0.699   |

The zoom lens depicted in FIG. 4 and described in the above prescription Table III has the parameters (I)–(V) as follows:

| $D_{34W}/F_W$ | $F_1/F_W$ | $F_2/F_W$ | $F_3/F_W$ | $F_4/F_W$ |
|---------------|-----------|-----------|-----------|-----------|
| 2.29          | -0.82     | 1.26      | 2.60      | 1.96      |

As apparent from the above, the zoom lens shown in FIG. 4 satisfies all of the conditions (I)–(V).

Spherical aberrations for e-line, F-line and C-line, astigmatism in sagittal and tangential planes, distortion and lateral chromatic aberrations of the projection lens shown in FIG. 4 at the wide angle end, at the intermediate focal length position and at the telephoto end are shown in FIGS. 13A–13D, FIGS. 14A–14D and FIGS. 15A–15D, respectively. As apparent from FIGS. 13A–13D, 14A–14D and 15A–15D, the zoom lens has well balanced aberrations over the range of zooming and remains the overall compactness with an axial air space for the optical path composing element (Lp) 22 remained broad.

A projection lens as shown in FIG. 5 scaled to F numbers of 3.29, 3.67 and 4.11 at the wide angle end (the shortest focal length position), the intermediate position and the telephoto end (the longest focal length position), respectively, and image angles (2ω) of 40.6°, 34.6° and 29.4° at the wide angle end (the shortest focal length position), the intermediate position and the telephoto end (the longest focal length position), respectively, is substantially described in Table IV.

TABLE IV

| Element | Radius of Curvature (mm) | Axial distance Between Surfaces (mm) | Nd | vd |
|---|---|---|---|---|
| $L_1$ | $R_1 = 2.961$ | $D_1 = 0.051$ | 1.80518 | 25.5 |
|  | $R_2 = 0.793$ | $D_2 = 0.072$ |  |  |
| $L_2$ | $R_3 = -6.397$ | $D_3 = 0.051$ | 1.67270 | 32.2 |
|  | $R_4 = 0.851$ | $D_4 = 0.321$ |  |  |
| $L_3$ | $R_5 = -3.938$ | $D_5 = 0.065$ | 1.51823 | 58.9 |
|  | $R_6 = 1.060$ | $D_6 = 0$ |  |  |
| $L_4$ | $R_7 = 1.060$ | $D_7 = 0.104$ | 1.84666 | 23.8 |
|  | $R_8 = \infty$ | $D_8 = Z1$ |  |  |
| $L_5$ | $R_9 = 2.017$ | $D_9 = 0.095$ | 1.70154 | 41.1 |
|  | $R_{10} = -1.863$ | $D_{10} = Z2$ |  |  |
| $L_6$ | $R_{11} = -0.877$ | $D_{11} = 0.044$ | 1.80518 | 25.5 |
|  | $R_{12} = -1.505$ | $D_{12} = 0.437$ |  |  |
| $L_7$ | $R_{13} = -2.774$ | $D_{13} = 0.040$ | 1.80518 | 25.5 |
|  | $R_{14} = 1.496$ | $D_{14} = 0$ |  |  |
| $L_8$ | $R_{15} = 1.496$ | $D_{15} = 0.143$ | 1.51680 | 64.2 |
|  | $R_{16} = -0.950$ | $D_{16} = 0.003$ |  |  |
| $L_9$ | $R_{17} = 3.895$ | $D_{17} = 0.069$ | 1.65844 | 50.8 |
|  | $R_{18} = -2.471$ | $D_{18} = Z3$ |  |  |
| $L_p$ | $R_{19} = \infty$ | $D_{19} = 0.726$ | 1.51633 | 64.1 |
|  | $R_{20} = \infty$ | $D_{20} = 1.834$ |  |  |
| $L_{10}$ | $R_{21} = 1.017$ | $D_{21} = 0.098$ | 1.51680 | 64.2 |
|  | $R_{22} = \infty$ | $D_{22} = 0.084$ |  |  |
| $L_q$ | $R_{23} = \infty$ | $D_{23} = 0.017$ | 1.51633 | 64.1 |
|  | $R_{24} = \infty$ |  |  |  |

Zoom Spacing

|  | Z1 (mm) | Z2 (mm) | Z3 (mm) |
|---|---|---|---|
| WAE | 0.382 | 0.339 | 0.073 |
| INT | 0.198 | 0.348 | 0.372 |
| TPE | 0.042 | 0.352 | 0.720 |

The zoom lens depicted in FIG. 5 and described in the above prescription Table IV has the parameters (I)–(V) as follows:

| $D_{34W}/F_W$ | $F_1/F_W$ | $F_2/F_W$ | $F_3/F_W$ | $F_4/F_W$ |
|---|---|---|---|---|
| 2.39 | -0.92 | 1.43 | 3.19 | 1.96 |

As apparent from the above, the zoom lens shown in FIG. 5 satisfies all of the conditions (I)–(V).

Spherical aberrations for e-line, F-line and C-line, astigmatism in sagittal and tangential planes, distortion and lateral chromatic aberrations of the projection lens shown in FIG. 5 at the wide angle end, at the intermediate focal length position and at the telephoto end are shown in FIGS. 16A–16D, FIGS. 17A–17D and FIGS. 18A–18D, respectively. As apparent from FIGS. 16A–16D, 17A–17D and 18A–18D, the zoom lens has well balanced aberrations over the range of zooming and remains the overall compactness with an axial air space for the optical path composing element (Lp) 22 remained broad.

A projection lens as shown in FIG. 6 scaled to F numbers of 3.30, 3.67 and 4.11 at the wide angle end (the shortest focal length position), the intermediate position and the telephoto end (the longest focal length position), respectively, and image angles (2ω) of 40.8°, 34.6° and 29.6° at the wide angle end (the shortest focal length position), the intermediate position and the telephoto end (the longest focal length position), respectively, is substantially described in Table V.

TABLE V

| Element | Radius of Curvature (mm) | Axial distance Between Surfaces (mm) | Nd | vd |
|---|---|---|---|---|
| $L_1$ | $R_1 = 1.873$ | $D_1 = 0.058$ | 1.80518 | 25.4 |
|  | $R_2 = 0.771$ | $D_2 = 0.092$ |  |  |
| $L_2$ | $R_3 = -1.900$ | $D_3 = 0.051$ | 1.67270 | 32.1 |
|  | $R_4 = 0.867$ | $D_4 = 0.252$ |  |  |
| $L_3$ | $R_5 = -17.564$ | $D_5 = 0.065$ | 1.51823 | 58.9 |
|  | $R_6 = 1.003$ | $D_6 = 0$ |  |  |
| $L_4$ | $R_7 = 1.003$ | $D_7 = 0.119$ | 1.84666 | 23.8 |
|  | $R_8 = -6.336$ | $D_8 = Z1$ |  |  |
| $L_5$ | $R_9 = 2.623$ | $D_9 = 0.090$ | 1.70154 | 41.1 |
|  | $R_{10} = -1.918$ | $D_{10} = Z2$ |  |  |
| $L_6$ | $R_{11} = -0.805$ | $D_{11} = 0.049$ | 1.80518 | 25.4 |
|  | $R_{12} = -1.189$ | $D_{12} = 0.375$ |  |  |
| $L_7$ | $R_{13} = -2.665$ | $D_{13} = 0.052$ | 1.80518 | 25.4 |
|  | $R_{14} = 1.701$ | $D_{14} = 0$ |  |  |
| $L_8$ | $R_{15} = 1.701$ | $D_{15} = 0.142$ | 1.51633 | 64.1 |
|  | $R_{16} = -0.958$ | $D_{16} = 0.003$ |  |  |
| $L_9$ | $R_{17} = 3.967$ | $D_{17} = 0.072$ | 1.65844 | 50.9 |
|  | $R_{18} = -2.287$ | $D_{18} = Z3$ |  |  |
| $L_p$ | $R_{19} = \infty$ | $D_{19} = 0.727$ | 1.51633 | 64.1 |
|  | $R_{20} = \infty$ | $D_{20} = 1.835$ |  |  |
| $L_{10}$ | $R_{21} = 1.018$ | $D_{21} = 0.098$ | 1.51680 | 64.2 |
|  | $R_{22} = \infty$ | $D_{22} = 0.084$ |  |  |
| $L_q$ | $R_{23} = \infty$ | $D_{23} = 0.017$ | 1.51633 | 64.1 |
|  | $R_{24} = \infty$ |  |  |  |

Zoom Spacing

|  | Z1 (mm) | Z2 (mm) | Z3 (mm) |
|---|---|---|---|
| WAE | 0.376 | 0.420 | 0.073 |
| INT | 0.196 | 0.438 | 0.372 |
| TPE | 0.042 | 0.447 | 0.722 |

The zoom lens depicted in FIG. 6 and described in the above prescription Table V has the parameters (I)–(V) as follows:

| $D_{34W}/F_W$ | $F_1/F_W$ | $F_2/F_W$ | $F_3/F_W$ | $F_4/F_W$ |
|---|---|---|---|---|
| 2.39 | −0.91 | 1.58 | 2.62 | 1.96 |

As apparent from the above, the zoom lens shown in FIG. 6 satisfies all of the conditions (I)–(V).

Spherical aberrations for e-line, F-line and C-line, astigmatism in sagittal and tangential planes, distortion and lateral chromatic aberrations of the projection lens shown in FIG. 6 at the wide angle end, at the intermediate focal length position and at the telephoto end are shown in FIGS. 19A–19D, FIGS. 20A–20D and FIGS. 21A–21D, respectively. As apparent from FIGS. 19A–19D, 20A–20D and 21A–21D, the zoom lens has well balanced aberrations over the range of zooming and remains the overall compactness with an axial air space for the optical path composing element (Lp) 22 remained broad.

Zoom lens of the type having four lens groups of the invention, which includes first to third lens groups movable relative to one another during zooming, prevents or significantly reduces a change rate of spherical aberrations during zooming and yields an increased degree of design freedom in connection with aberration correction. Furthermore, the zoom lens satisfying the conditions set forth above has well balanced aberrations, remains the overall compactness for an image size while having the back focal distance sufficient for the optical path composing optical element. The zoom lens is easily adapted to be of a telecentric type which significantly reduces uneven contrast of an projected image and quantitative loss of light when installed in the projection type of display system such as the projection type of television system.

Although the lens of the invention has been described as a projection lens for a video projector in each of the above embodiments, it may be utilized as an image forming lens for various types of cameras as well.

It is to be understood that the present invention may be embodied with various changes, modifications and improvements, which may occur to those skilled in the art, without departing from the spirit and scope of the invention defined in the following claims.

What is claimed is:

1. A zoom lens comprising, in order from the image end to the object end, a negative power first lens group, a positive power second lens group, a positive power third lens group and a positive power fourth lens group, said first, second and third lens groups being axially movable in predetermined relation relative to one another and relative to said fourth lens group which is stationary to focus and vary the focal length of the zoom lens, the zoom lens satisfying the following condition:

$1.6 < D_{34w}/F_w < 2.8$ where $D_{34w}$ is the axial air distance the third and fourth lens groups of the zoom lens at the wide angle end position and $F_w$ is the focal length of the overall zoom lens at the wide angle end position.

2. A zoom lens as defined in claim 1, and further satisfying the following conditions:

$-1.5 < F_1/F_w < -0.5$ $0.8 < F_2/F_w < 2.0$ $1.8 < F_3/F_w < 3.8$ $0.5 < F_4/F_w < 4.0$ where $F_1$, $F_2$, $F_3$ and $F_4$ are the focal lengths of the overall first, second, third and fourth lens groups, respectively.

3. A zoom lens as defined in claim 2, wherein said fourth lens group comprises a single component of a bi-convex lens element.

4. A zoom lens as defined in claim 2, wherein said second lens group comprises a single component of a bi-convex lens element.

5. A zoom lens as defined in claim 3, wherein said second lens group comprises a single component of a positive power lens element.

6. A zoom lens as defined in claim 1 scaled to F numbers of 3.50, 3.91 and 4.47 at the wide angle end (WAE), the intermediate position (INT) and the telephoto end (TPE), respectively, and image angles (2ω) of 53.4°, 43.0° and 34.6° at the wide angle end (WAE), the intermediate position (INT) and the telephoto end (TPE), respectively, substantially as described:

| Element | Radius of Curvature (mm) | Axial distance Between Surfaces (mm) | Nd | νd |
|---|---|---|---|---|
| $L_1$ | $R_1 = 3.803$ | $D_1 = 0.088$ | 1.62299 | 58.1 |
|  | $R_2 = -2.063$ | $D_2 = 0.002$ |  |  |
| $L_2$ | $R_3 = 1.764$ | $D_3 = 0.045$ | 1.62041 | 60.4 |
|  | $R_4 = 0.501$ | $D_4 = 0.170$ |  |  |
| $L_3$ | $R_5 = -0.564$ | $D_5 = 0.034$ | 1.63854 | 55.4 |
|  | $R_6 = 1.041$ | $D_6 = 0.161$ |  |  |
| $L_4$ | $R_7 = 1.623$ | $D_7 = 0.075$ | 1.60342 | 38.0 |
|  | $R_8 = -1.380$ | $D_8 = Z1$ |  |  |
| $L_5$ | $R_9 = 1.653$ | $D_9 = 0.069$ | 1.63854 | 23.8 |
|  | $R_{10} = -2.077$ | $D_{10} = Z2$ |  |  |
| $L_6$ | $R_{11} = -0.806$ | $D_{11} = 0.034$ | 1.84666 | 23.8 |
|  | $R_{12} = -1.103$ | $D_{12} = 0.294$ |  |  |
| $L_7$ | $R_{13} = -14.473$ | $D_{13} = 0.037$ | 1.80518 | 25.5 |
|  | $R_{14} = 1.709$ | $D_{14} = 0.019$ |  |  |
| $L_8$ | $R_{15} = 4.925$ | $D_{15} = 0.076$ | 1.58913 | 61.2 |
|  | $R_{16} = -1.184$ | $D_{16} = 0.002$ |  |  |
| $L_9$ | $R_{17} = 7.027$ | $D_{17} = 0.062$ | 1.62041 | 60.4 |
|  | $R_{18} = -1.800$ | $D_{20} = Z3$ |  |  |
| $L_{10}$ | $R_{21} = 1.370$ | $D_{21} = 0.132$ | 1.51633 | 64.1 |
|  | $R_{22} = \infty$ | $D_{22} = 0.113$ |  |  |

| Zoom Spacing | | | |
|---|---|---|---|
|  | Z1 (mm) | Z2 (mm) | Z3 (mm) |
| WAE | 0.464 | 0.216 | 1.981 |
| INT | 0.238 | 0.247 | 2.327 |
| TPE | 0.056 | 0.300 | 2.774 | where the zoom lens comprises lens elements $L_1$ to $L_4$ for the first lens group, a lens element $L_5$ for the second lens group, lens elements $L_6$ to $L_9$ for the third lens group and a lens element $L_{10}$ for the fourth lens group, said lens elements $L_1$ to $L_{10}$ having surfaces $R_1$ to $R_{18}$, $R_{21}$ and $R_{22}$ in order from the image end to the object end, reference axial distance numbers D followed by an Arabic numeral given in millimeter (mm) are the progressive axial air distances between adjacent surfaces, the index of refraction is given by Nd, the dispersion υd is measured by the Abbe number, Z1, Z2 and Z3 given in millimeter (mm) are the variable air spacing at the indicated focal positions, i.e. the wide angle end (WAE), the intermediate position (INT) and the telephoto end (TPE), respectively.

7. A zoom lens as defined in claim 1 scaled to F numbers of 3.26, 3.54 and 3.89 at the wide angle end (WAE), the intermediate position (INT) and the telephoto end (TPE), respectively, and image angles (2ω) of 53.4°, 42.8° and 34.6° at the wide angle end (WAE), the intermediate position (INT) and the telephoto end (TPE), respectively, substantially as described:

| Element | Radius of Curvature (mm) | Axial distance Between Surfaces (mm) | Nd | υd |
|---|---|---|---|---|
| $L_2$ | $R_3 = 1.525$ | $D_3 = 0.065$ | 1.49018 | 57.8 |
|  | $R_4 = 0.460$ | $D_4 = 0.476$ |  |  |
| $L_3$ | $R_5 = -0.544$ | $D_5 = 0.034$ | 1.51680 | 64.2 |
|  | $R_6 = 1.399$ | $D_6 = 0.0001$ |  |  |
| $L_4$ | $R_7 = 1.326$ | $D_7 = 0.088$ | 1.70154 | 41.1 |
|  | $R_8 = -1.326$ | $D_8 = Z1$ |  |  |
| $L_5$ | $R_9 = 1.606$ | $D_9 = 0.072$ | 1.65844 | 50.8 |
|  | $R_{10} = -2.544$ | $D_{10} = Z2$ |  |  |
| $L_6$ | $R_{11} = -0.991$ | $D_{11} = 0.034$ | 1.51742 | 52.2 |
|  | $R_{12} = -1.718$ | $D_{12} = 0.382$ |  |  |
| $L_7$ | $R_{13} = -3.361$ | $D_{13} = 0.037$ | 1.84666 | 23.8 |
|  | $R_{14} = 2.029$ | $D_{14} = 0.022$ |  |  |
| $L_8$ | $R_{15} = 9.748$ | $D_{15} = 0.083$ | 1.62041 | 60.4 |
|  | $R_{16} = -1.063$ | $D_{16} = 0.002$ |  |  |
| $L_9$ | $R_{17} = 1.963$ | $D_{17} = 0.070$ | 1.62299 | 58.1 |
|  | $R_{18} = -3.454$ | $D_{20} = Z3$ |  |  |
|  | $R_{21} = 1.367$ |  |  |  |
| $L_{10}$ | $R_{22} = \infty$ | $D_{21} = 0.132$ | 1.51633 | 64.1 |

| | Zoom Spacing | | |
|---|---|---|---|
| | Z1 (mm) | Z2 (mm) | Z3 (mm) |
| WAE | 0.475 | 0.0966 | 1.996 |
| INT | 0.243 | 0.156 | 2.337 |
| TPE | 0.056 | 0.207 | 2.777 | where the zoom lens comprises lens elements $L_2$ to $L_4$ for the first lens group, a lens element $L_5$ for the second lens group, lens elements $L_6$ to $L_9$ for the third lens group and a lens element $L_{10}$ for the fourth lens group, said lens elements $L_2$ to $L_{10}$ having surfaces $R_3$ to $R_{18}$, $R_{21}$ and $R_{22}$ in order from the image end to the object end, reference axial distance numbers D followed by an Arabic numeral given in millimeter (mm) are the progressive axial air distances between adjacent surfaces, the index of refraction is given by Nd, the dispersion υd is measured by the Abbe number, Z1, Z2 and Z3 given in millimeter (mm) are the variable air spacing at the indicated focal positions, i.e. the wide angle end (WAE), the intermediate position (INT) and the telephoto end (TPE), respectively.

8. A zoom lens as defined in claim 7, wherein said lens element at the image end of said first lens group has an aspherical image side surface as defined by the following equation:

$$X=CY^2/[1+(1-KC^2Y^2)^{1/2}]+a_4Y^4+a_6Y^6+a_8Y^8+a_{10}Y^{10}$$

where X is the surface sag at a semi-aperture distance Y from the optical axis OX of the zoom lens, C is the curvature of a lens surface which is equal to the reciprocal of the radius on the optical axis OX, K is a conic constant, and $a_4$, $a_6$, $a_8$ and $a_{10}$ are aspherical coefficients.

9. A zoom lens as defined in claim 8, wherein said aspherical image side surface is substantially as described:

| K | $a_4$ | $a_6$ | $a_8$ | $a_{10}$ |
|---|---|---|---|---|
| 1.0000 | 0.5474E+00 | 0.1967E+00 | 0.1500E+01 | 0.8929E+00 |

* * * * *